US012601599B2

(12) United States Patent
Zhang

(10) Patent No.: US 12,601,599 B2
(45) Date of Patent: Apr. 14, 2026

(54) SYSTEM AND METHOD FOR IMPROVING THE LINEAR FEATURE AT INTERSECTION LOCATION

(71) Applicant: HERE Global B.V., Eindhoven (NL)

(72) Inventor: Zhenhua Zhang, Pocatello, ID (US)

(73) Assignee: HERE GLOBAL B.V., Eindhoven (NL)

( * ) Notice: Subject to any disclaimer, the term of this patent is extended or adjusted under 35 U.S.C. 154(b) by 298 days.

(21) Appl. No.: 18/081,374

(22) Filed: Dec. 14, 2022

(65) Prior Publication Data

US 2024/0200952 A1 Jun. 20, 2024

(51) Int. Cl.
*G01C 21/30* (2006.01)

(52) U.S. Cl.
CPC ..................................... *G01C 21/30* (2013.01)

(58) Field of Classification Search
CPC ........................... G01C 21/30; G01C 21/3602; G01C 21/3815; G01C 21/3658; G01C 21/3819; G01C 21/38; G06V 20/588; G06V 10/457; G06V 10/80; G06V 20/182; G06V 20/13; G05D 1/0274; B60W 2552/53; B60W 2556/40; B60W 2552/10; B60W 30/12; B60W 40/072; B60W 30/18154; B60W 30/18159
See application file for complete search history.

(56) References Cited

U.S. PATENT DOCUMENTS 11,156,466 B2 10/2021 Morimoto

2017/0148327 A1* 5/2017 Sim ........................ G08G 1/167
2019/0111930 A1 4/2019 Katsura et al.
2020/0324764 A1 10/2020 Johnson et al.
(Continued)

FOREIGN PATENT DOCUMENTS

| CN | 110377041 A | 10/2019 |
| CN | 112309233 A | 2/2021 |
| JP | 4603970 B2 | 12/2010 |

OTHER PUBLICATIONS

Zhou et al., "Automatic construction of lane-level HD maps for urban scenes", Jul. 2021, 9 pages.
(Continued)

*Primary Examiner* — Hunter B Lonsberry
*Assistant Examiner* — Henry R Hinton
(74) *Attorney, Agent, or Firm* — DITTHAVONG, STEINER & MLOTKOWSKI

(57) ABSTRACT

A system is disclosed for determining intersection location data. The system, for example, obtains reference feature data for a reference lane marking. The reference lane marking is associated with an intersection location. The system generates intersection line feature data for an intersection line lane marking based on the reference feature data. The intersection line lane marking has the intersection location, the reference lane marking being within a predefined proximity from the intersection line lane marking. The system generates intersection feature data associated with the intersection location for the intersection line lane marking based on the reference feature data and the intersection line feature data. The system determines intersection location data for the intersection location based on the reference feature data, the intersection line feature data and the intersection feature data.

12 Claims, 10 Drawing Sheets

(56) References Cited

U.S. PATENT DOCUMENTS

| | | | |
|---|---|---|---|
| 2021/0172756 A1 | 6/2021 | Wheeler et al. | |
| 2022/0306116 A1* | 9/2022 | Hashimoto | ..... B60W 30/18163 |
| 2022/0309806 A1* | 9/2022 | Zhou | .................... G06V 20/588 |

OTHER PUBLICATIONS

Homayounfar et al., "DAGMapper: learning to map by discovering lane topology", Feb. 27, 2020, pp. 2911-2920.
Poggenhans et al., "Lanelet2: A high-definition map framework for the future of Automated driving", Dec. 10, 2018, 8 pages.

* cited by examiner

300

400

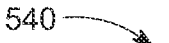
540
| |
|---|
| DETERMINE HEADING INFORMATION FOR A FIRST TOPOLOGICAL SEGMENT |
524
| |
|---|
| DETERMINE LOCATION INFORMATION FOR THE FIRST TOPOLOGICAL SEGMENT |
526
| |
|---|
| GENERATE INTERSECTION LINE FEATURE DATA FOR THE FIRST TOPOLOGICAL SEGMENT |
528
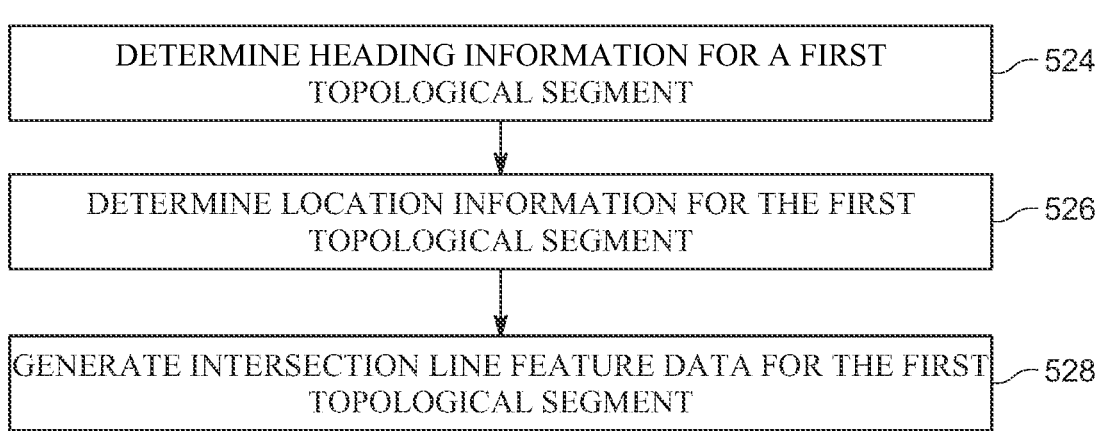
FIG. 5D
600
| |
|---|
| DETERMINE A FIRST CROSS-TRACK DISTANCE |
602
| |
|---|
| DETERMINE ORIENTATION INFORMATION |
604
| |
|---|
| DETERMINE INTERSECTION FEATURE DATA |
606
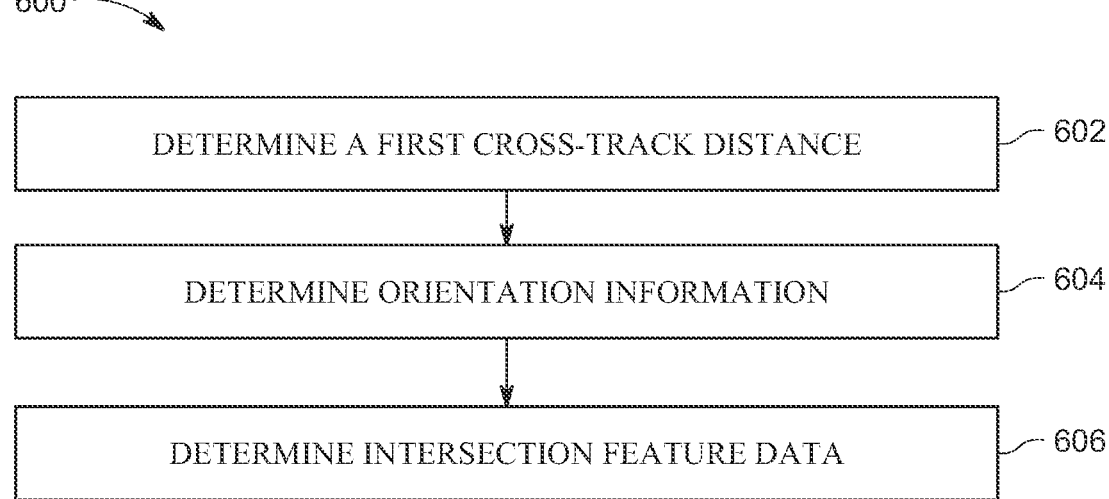
FIG. 6A

630

DETERMINE A FIRST CROSS-TRACK DISTANCE — 632

DETERMINE ORIENTATION INFORMATION — 634

IDENTIFY ONE OR MORE TOPOLOGY SEGMENTS — 636

DETERMINE A SECOND CROSS-TRACK DISTANCE — 638

640 — SECOND CROSS-TRACK DISTANCE <= 0

NO

644 — INTERSECTION LOCATION POINT REACHED ?

NO

YES

YES

642 — DETERMINE AN INTERSECTION LOCATION POINT

STOP DETERMINATION — 646

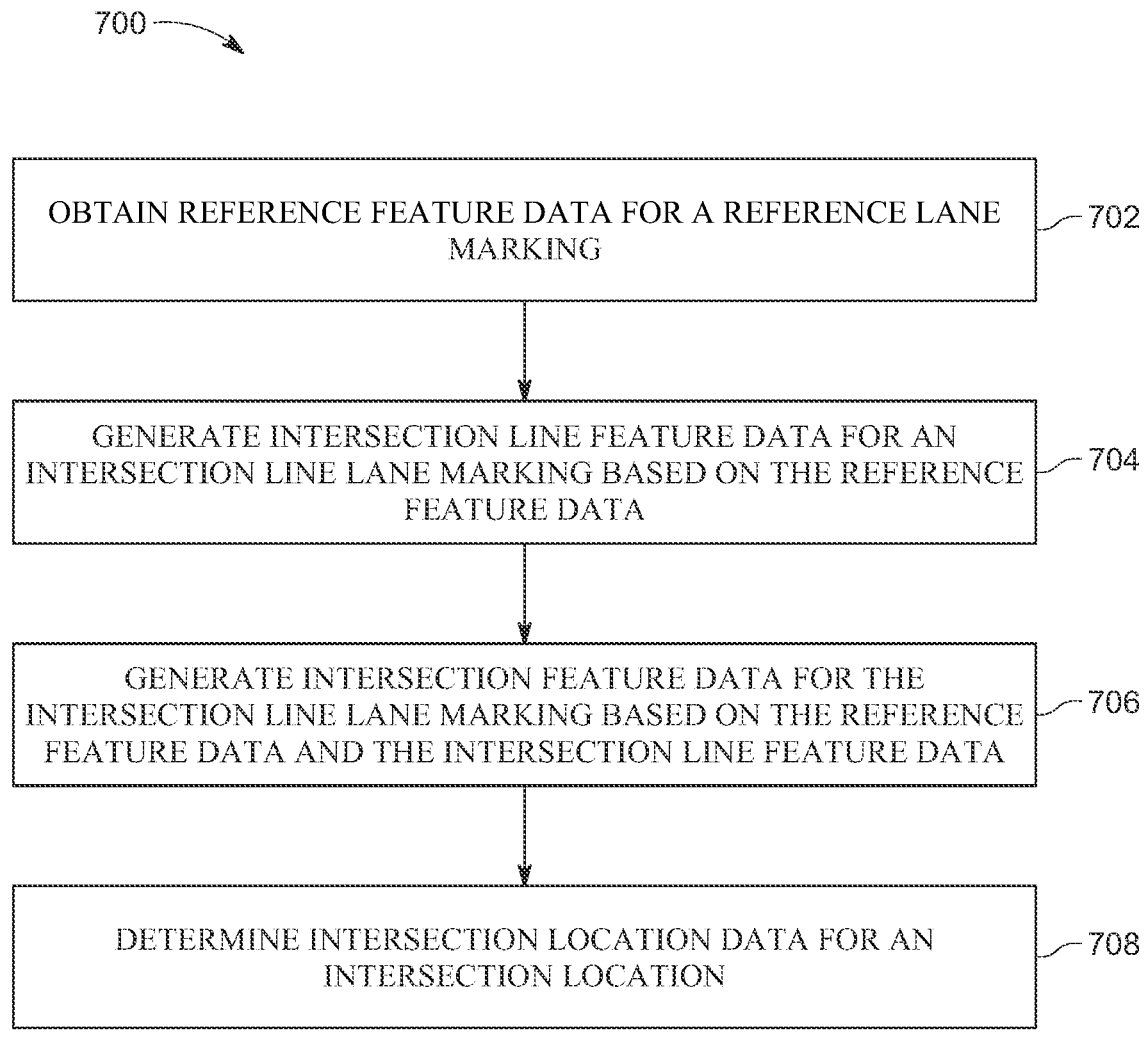

700

OBTAIN REFERENCE FEATURE DATA FOR A REFERENCE LANE MARKING — 702

GENERATE INTERSECTION LINE FEATURE DATA FOR AN INTERSECTION LINE LANE MARKING BASED ON THE REFERENCE FEATURE DATA — 704

GENERATE INTERSECTION FEATURE DATA FOR THE INTERSECTION LINE LANE MARKING BASED ON THE REFERENCE FEATURE DATA AND THE INTERSECTION LINE FEATURE DATA — 706

DETERMINE INTERSECTION LOCATION DATA FOR AN INTERSECTION LOCATION — 708

FIG. 7

SYSTEM AND METHOD FOR IMPROVING THE LINEAR FEATURE AT INTERSECTION LOCATION

TECHNOLOGICAL FIELD

The present disclosure generally relates to improving linear features in map databases, and more particularly relates to generating accurate linear features of intersection locations in map databases.

BACKGROUND

Navigation applications for a vehicle generally rely on data stored in a map database for identifying various navigation related entities such as road objects, links, lane markings, road segments, road geometries and the like. In case the vehicle is an autonomous vehicle, accurate detection of navigation related entities becomes more important to provide a safe and reliable navigation service. However, sometimes the data stored in the map database may be incomplete or inaccurate due to many reasons. These may include, for example, errors in data collection, less frequent data updating in the map database, presence of obstructions during data collection, and improper optimization techniques applied on collected data. Specifically, map data near intersection locations encountered with lane markings tends to be inaccurate due to different linear features merging or splitting from the intersection locations. In such cases, it is imperative to supplement the conventional methods of data collection with additional methods and systems.

Therefore, there is a need to have updated and accurate map data related to navigation entities, specifically, lane markings, for provision of accurate navigation services.

BRIEF SUMMARY OF SOME EXAMPLE EMBODIMENTS

The modern day navigation services is based on high definition (HD) maps and real-time data for depicting map data with greater clarity and accuracy on superior in-vehicle user interfaces. In such cases, it becomes critical to depict information of navigation related entities and their attributes with accuracy, clarity and precision. However, due to reliance of data collection technologies on a plurality of data sources for collecting map data (like for high definition maps), likelihood of errors in the collected data due to different types of data sources may increase. Examples of the plurality of data sources may include, but are not limited to, sensors, satellite imagery, ground truth vehicles, and the like. In some cases, the collected data may be optimized to fill gaps and enhance accuracy of navigation related entities.

For example, in the case of map data related to lane markings, there may be reliance on data sources with image recognition capabilities for detecting lane markings. These data sources may include vehicle sensors or cameras and satellite images detecting lanes markings. Sometimes there may be errors in detecting correct lane markings in these data sources due to a number of reasons, including but not limited to: malfunctioning in a detection component, partial occlusion of the lane markings by nearby trees or nearby vehicles, faded lane markings on a link, and the like. These errors in turn lead to incomplete and discontinuous data related to the lane markings. The lane markings also include markings corresponding to intersection locations of two road lanes, such as where two lanes may merge into one lane or one lane splits into two lanes. The errors in data relating to the lane markings are more significant at such intersection locations.

The errors in data corresponding to the intersection location may be caused due to incomplete, incorrect and/or duplicate data related to the lane markings. Such errors may further aggravate due to reliance of data collection technologies or data optimization technologies on clustering logic to group lane markings close to each other. Therefore, the intersection location markings identified on the lane markings may be incorrect and inaccurate. The conventional techniques may fail to work properly, such as when two lanes markings are very close to each other, for example, near an intersection location, an intersection location marking for the intersection location may not be accurate.

The lane markings may be depicted on a mapping interface, such as on the high definition (HD) map, which may show an incorrect intersection location due to errors. This may pose serious problems in navigation of vehicles. Specifically, in case of autonomous vehicles, the problem may become graver if accurate lane marking detection and corresponding information is not provided in real-time, leading to delayed navigation decision and accidents.

In order to solve the foregoing problem, the present disclosure may provide systems and methods that generate improved intersection location data for an intersection location associated with a lane marking in map databases. The methods and systems provide techniques for complementing the sensor data and map data with advanced algorithms so that missing parts or inaccurate part in lane markings of lane marking data may be completed, and lane markings are close or accurate with regard to real lanes of roads. The accurate lane marking data and/or map data may then be used in various navigation applications to provide reliable, safe, and accurate navigation. Further, the updated map data may aid in avoiding unwanted conditions such as road accidents, head-on collisions of vehicles, fatalities, and the like.

Various embodiments are provided herein for generating improved feature data for lane markings, which may have accurate markings corresponding to intersection locations. The generation of improved feature data may encompass updating linear features of one or more lane markings associated with an intersection location. In this regard, reference feature data for a reference lane marking is obtained. Moreover, intersection line feature data for an intersection line lane marking is generated. The reference lane marking may be within a predefined distance, such as nearby, to the intersection line lane marking having the intersection location. For example, the intersection location may be formed between the reference lane marking and the intersection line lane marking, such that the intersection line lane marking merges with or splits from the reference lane marking at the intersection location. Based on the reference feature data and the intersection line feature data, intersection feature data for the intersection line lane marking is generated. The intersection feature data is associated with an area of the intersection location. Thereafter, intersection location data is determined for the intersection location based on the reference feature data, the intersection line feature data and the intersection feature data. The intersection location data indicates improved linear features corresponding to the intersection location. In this manner, the intersection location may be accurately depicted for the intersection line lane marking. Once accurate intersection location is obtained, the improved linear features for the reference lane marking and the intersection line lane marking may be used for generating improved lane markings.

Thus, as disclosed herein, the methods and systems describing the process disclosed in various embodiments, does not need to rely on map data and sensor data solely to improve the lane markings. Therefore, the methods and systems disclosed herein provide efficient mechanisms to improve linear features of lane markings, and subsequently use the improved linear features of the lane markings in navigation applications. This is highly advantageous especially in the case of autonomous vehicles, which benefit from getting accurate, complete, and up-to-data lane data in real-time. This further ensures faster decision making while driving and thus, safer, and reliable navigation. Even in the case of semi-autonomous or manually driven vehicles, the correct, up-to-date, and complete data ensures better and reliable navigation. Further, the completed and accurate lane marking data may be used to update the map database and thus improve the quality of the map data, by removing inaccurate intersection location markings on lane markings and closing of the gaps for discontinuous or improper lane marking parts having incomplete data, which is helpful for all navigation services provided by using the map database A system, a method and a computer programmable product are provided for implementing the process for linear features generation by improving linear features of lane marking, specifically, linear features associated with an intersection location on a lane marking.

In one aspect, a system for generating the feature line is disclosed. The system comprises a memory configured to store computer-executable instructions; and at least one processor configured to execute the computer-executable instructions to obtain reference feature data for a reference lane marking. The reference lane marking is associated with an intersection location. The at least one processor is further configured to generate intersection line feature data for an intersection line lane marking based on the reference feature data. The intersection line lane marking has the intersection location, and the reference lane marking is within a predefined proximity from the intersection line lane marking. The at least one processor is further configured to generate intersection feature data for the intersection line lane marking based on the reference feature data and the intersection line feature data. The intersection feature data is associated with the intersection location. The at least one processor is further configured to determine intersection location data for the intersection location based on the reference feature data, the intersection line feature data and the intersection feature data.

In additional system embodiments, the at least one processor is further configured to generate the intersection line feature data upto a first end location, such that the first end location is within a first distance threshold from the intersection location; and generate the intersection feature data from the first end location till the intersection location.

In additional system embodiments, the at least one processor is further configured to determine a first cross-track distance between the first end location and a reference matched location on the reference lane marking, wherein the reference matched location is identified by extending a perpendicular from the first end location to the reference lane marking; determine orientation information for the first end location and the reference matched location; and determine the intersection feature data based on the first cross-track distance and the orientation information.

In additional system embodiments, the at least one processor is further configured to identify one or more topology segments of the reference lane marking, the one or more topology segments start after the reference matched location on the reference lane marking. The at least one processor is further configured to determine a second cross-track distance between a second end location of a topology segment from the one or more topology segments and an estimate matched point of the intersection line lane marking based on the intersection feature data. The estimate matched point is identified by extending an estimated perpendicular from the second end location to the intersection line lane marking. The at least one processor is further configured to determine the intersection location data for the intersection location based on the second cross-track distance, wherein the second cross-track distance is less than a first predefined threshold, and wherein the intersection location data comprises an intersection location point for the intersection location.

In additional system embodiments, the at least one processor is further configured to obtain sensor data for the intersection line lane marking; obtain map topology data associated with the intersection line lane marking; and generate the intersection line feature data for the intersection line lane marking based on the sensor data, the map topology data and a restriction condition. The restriction condition is associated with the intersection location.

In additional system embodiments, the restriction condition comprises at least one of a first restriction condition comprises a restriction to extend the intersection line feature data upto a first distance threshold from the intersection location, and a second restriction condition comprising a restriction to generate the intersection line feature data upto a second distance threshold from an end sensor data for the intersection line lane marking.

In additional system embodiments, the at least one processor is further configured to determine heading information for a first topological segment of the intersection line lane marking based on sensor data and map topology data; determine location information for the first topological segment based on the sensor data and the map topology data; and generate the intersection line feature data for the first topological segment based on a comparison between at least one of: the heading information for the first topological segment with heading information for a corresponding topological segment of the reference lane marking, or the location information for the first topological segment with location information for the corresponding topological segment of the reference lane marking.

In additional system embodiments, the at least one processor is further configured to generate an updated intersection line lane marking, based on the intersection line feature data, the intersection feature data and the intersection location data.

In another aspect, a method for determining intersection location data for an intersection location is provided. The method comprises obtaining reference feature data for a reference lane marking, the reference lane marking being associated with an intersection location; generating intersection line feature data for an intersection line lane marking based on the reference feature data, the intersection line lane marking having the intersection location, wherein the reference lane marking is within a predefined proximity from the intersection line lane marking; generating intersection feature data for the intersection line lane marking based on the reference feature data and the intersection line feature data, wherein the intersection feature data is associated with the intersection location; and determining intersection location data for the intersection location based on the reference feature data, the intersection line feature data and the intersection feature data.

In additional method embodiments, the method further comprises generating the intersection line feature data upto a first end location, such that the first end location is within a first distance threshold from the intersection location; and generating the intersection feature data from the first end location till the intersection location.

In additional method embodiments, the method further comprises determining a first cross-track distance between the first end location and a reference matched location on the reference lane marking, wherein the reference matched location is identified by extending a perpendicular from the first end location to the reference lane marking; determining orientation information for the first end location and the reference matched location; and determining the intersection feature data based on the first cross-track distance and the orientation information.

In additional method embodiments, the method further comprises identifying one or more topology segments of the reference lane marking, the one or more topology segments starting after the reference matched location on the reference lane marking; and determining a second cross-track distance between a second end location of a topology segment from the one or more topology segments and an estimate matched point of the intersection line lane marking based on the intersection feature data. The estimate matched point is identified by extending an estimated perpendicular from the second end location to the intersection line lane marking. The method further comprises determining the intersection location data for the intersection location based on the second cross-track distance, wherein the second cross-track distance is less than a first predefined threshold, and wherein the intersection location data comprises an intersection location point for the intersection location.

In additional method embodiments, the method further comprises obtaining sensor data for the intersection line lane marking; obtaining map topology data associated with the intersection line lane marking; and generating the intersection line feature data for the intersection line lane marking based on the sensor data, the map topology data and a restriction condition. The restriction condition is associated with the intersection location.

In additional method embodiments, the restriction condition comprises at least one of: a first restriction condition comprising a restriction to extend the intersection line feature data upto a first distance threshold from the intersection location, and a second restriction condition comprising a restriction to generate the intersection line feature data upto a second distance threshold from an end second sensor data for the intersection line lane marking.

In additional method embodiments, the method further comprises determining heading information for a first topological segment of the intersection line lane marking based on sensor data and map topology data; determining location information for the first topological segment based on the sensor data and the map topology data; and generating the intersection line feature data for the first topological segment based on a comparison between at least one of: the heading information for the first topological segment with heading information for a corresponding topological segment of the reference lane marking, or the location information for the first topological segment with location information for the corresponding topological segment of the reference lane marking.

In additional method embodiments, the method further comprises generating an updated intersection line lane marking, based on the intersection line feature data, the intersection feature data and the intersection location data.

In yet another aspect, a computer program product comprising a non-transitory computer readable medium having stored thereon computer executable instructions which when executed by at least one processor, cause the processor to carry out operations for determining intersection location data for the intersection location is provided. The operations comprise obtaining reference feature data for a reference lane marking, the reference lane marking being associated with an intersection location. The operations comprise generating intersection line feature data for an intersection line lane marking based on the reference feature data. The intersection line lane marking has the intersection location, wherein the reference lane marking is within a predefined proximity from the intersection line lane marking. The operations comprise generating intersection feature data for the intersection line lane marking based on the reference feature data and the intersection line feature data. The intersection feature data is associated with the intersection location. The operations comprise determining intersection location data for the intersection location based on the reference feature data, the intersection line feature data and the intersection feature data.

In additional computer program product embodiments, the operations further comprise generating the intersection line feature data upto a first end location, such that the first end location is within a first distance threshold from the intersection location; and generating the intersection feature data from the first end location till the intersection location.

In additional computer program product embodiments, the operations further comprise determining a first cross-track distance between the first end location and a reference matched location on the reference lane marking, wherein the reference matched location is identified by extending a perpendicular from the first end location to the reference lane marking; determining orientation information for the first end location and the reference matched location; and determining the intersection feature data based on the first cross-track distance and the orientation information.

In additional computer program product embodiments, the operations further comprise identifying one or more topology segments of the reference lane marking, the one or more topology segments starting after the reference matched location on the reference lane marking; determining a second cross-track distance between a second end location of a topology segment from the one or more topology segments and an estimate matched point of the intersection line lane marking based on the intersection feature data, wherein the estimate matched point is identified by extending an estimated perpendicular from the second end location to the intersection line lane marking; and determining the intersection location data for the intersection location based on the second cross-track distance, wherein the second cross-track distance is less than a first predefined threshold, and wherein the intersection location data comprises an intersection location point for the intersection location.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

Figure 1:
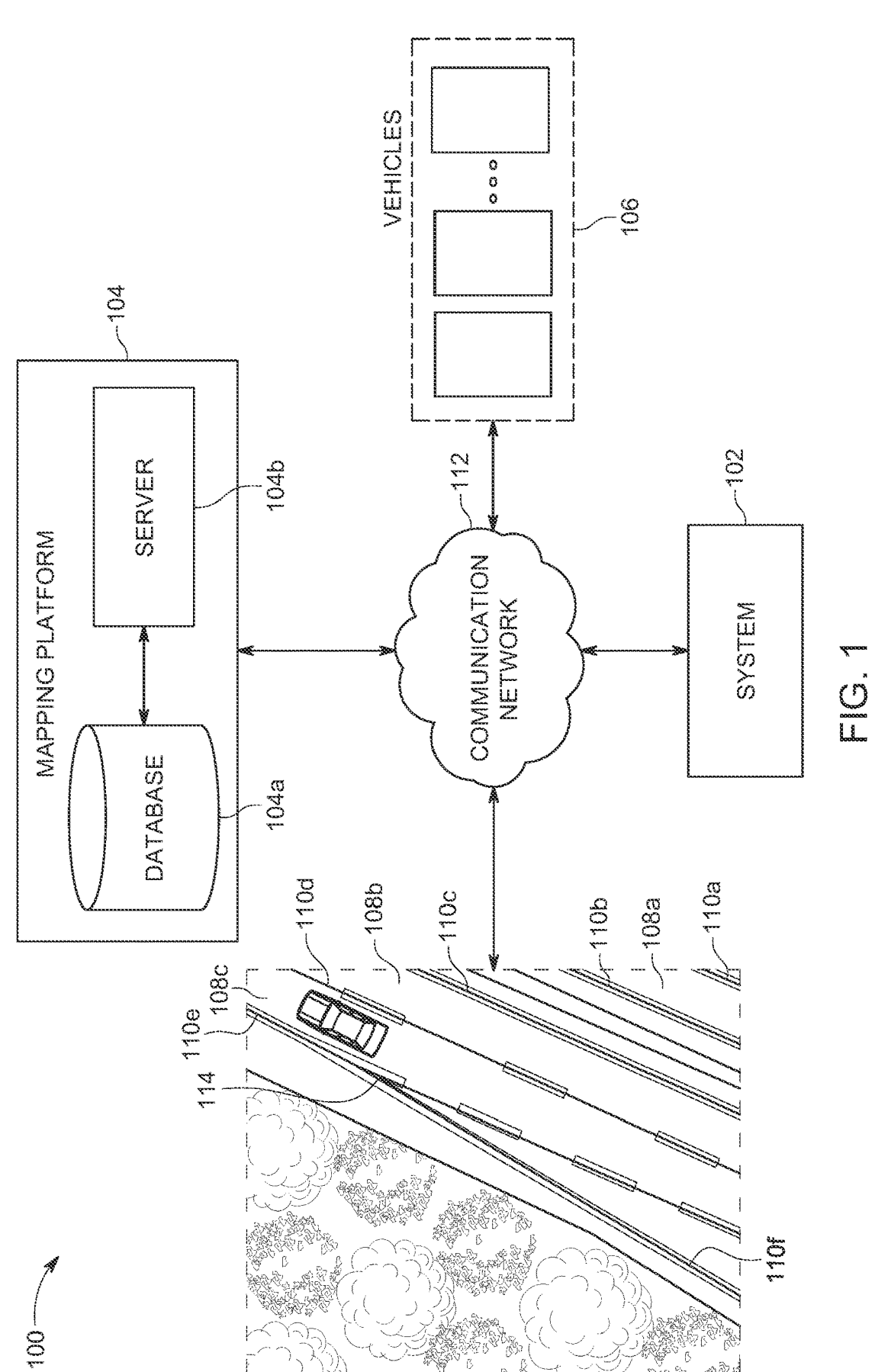
Figure 2:
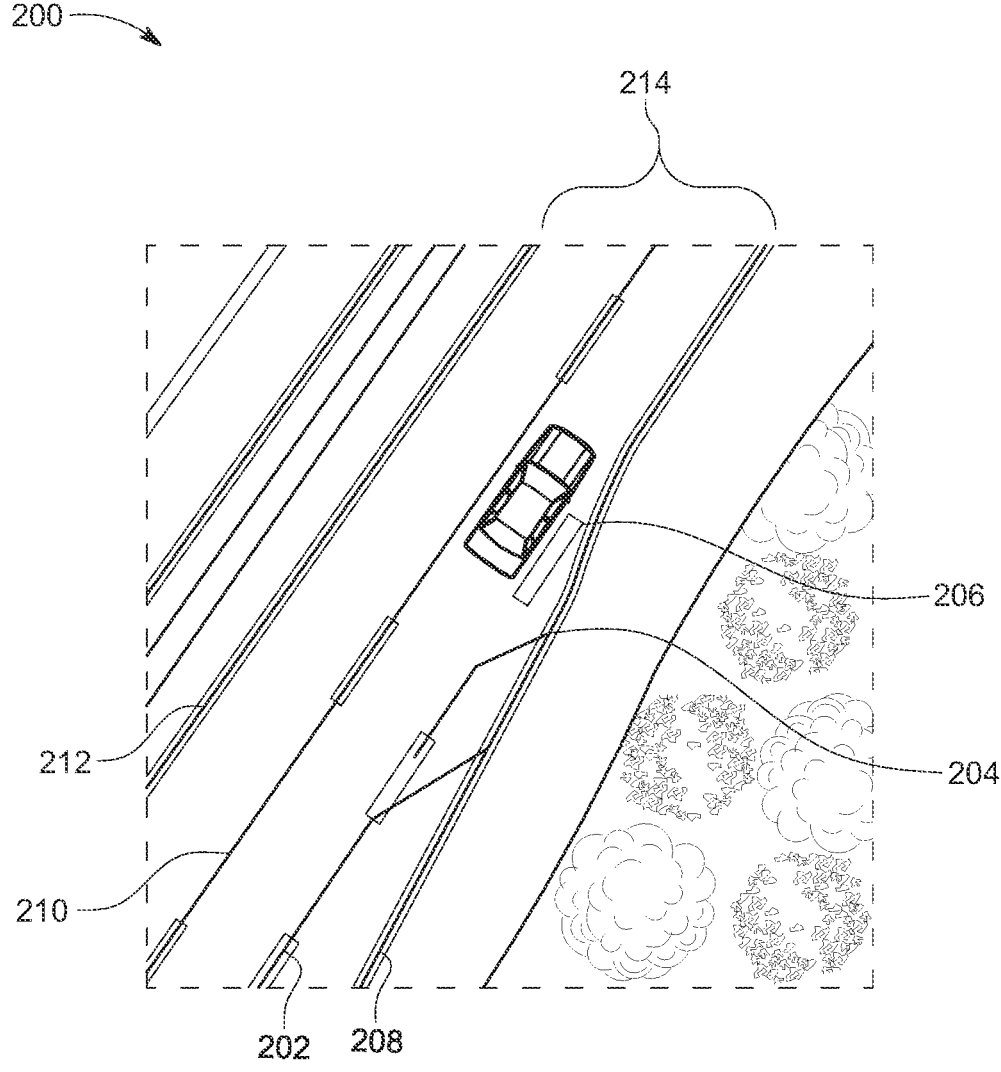
Figure 3:
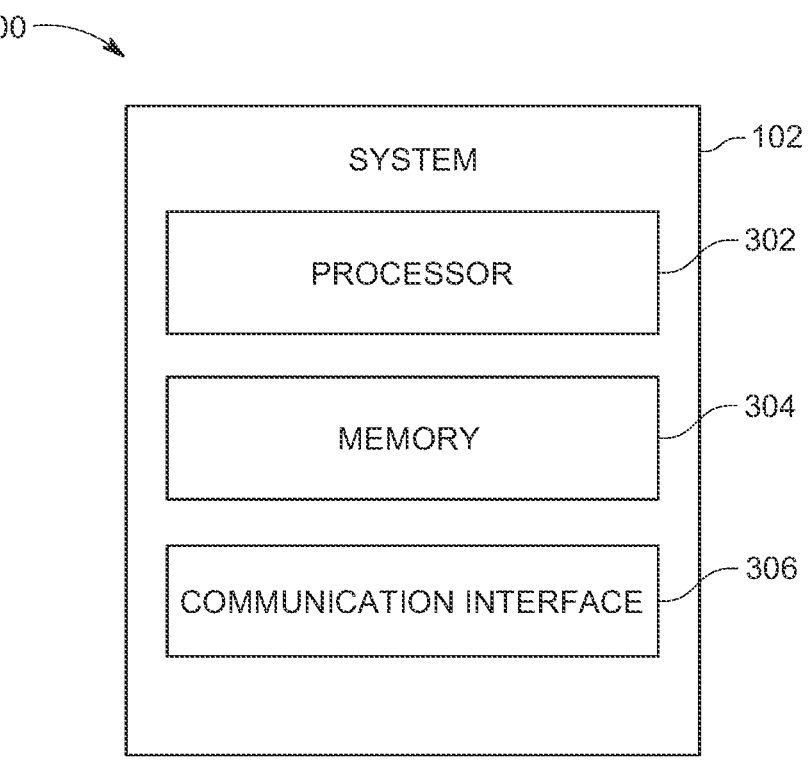
Figure 4A:
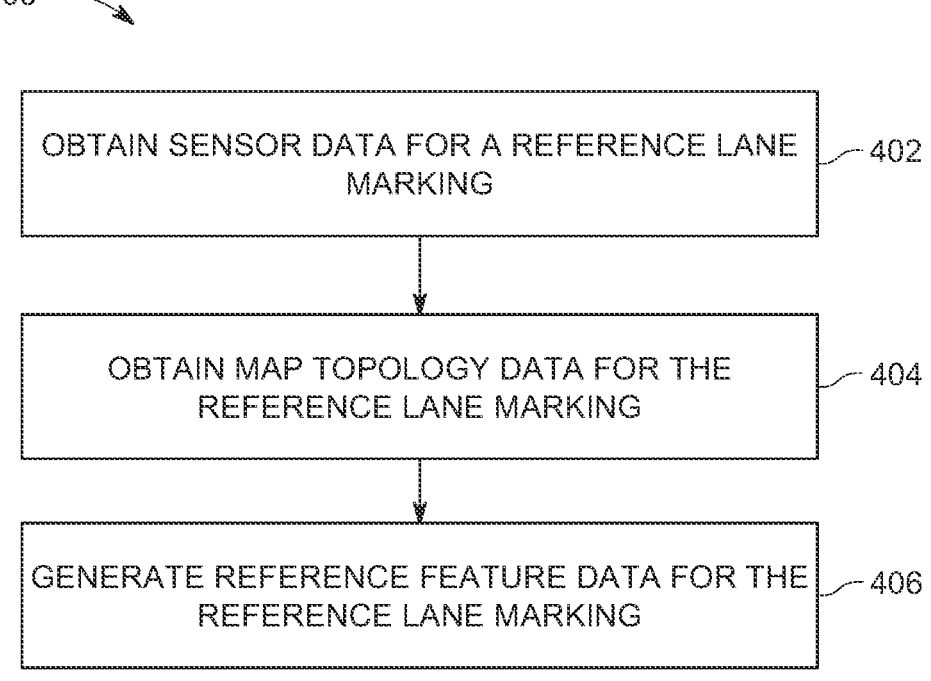
Figure 4B:
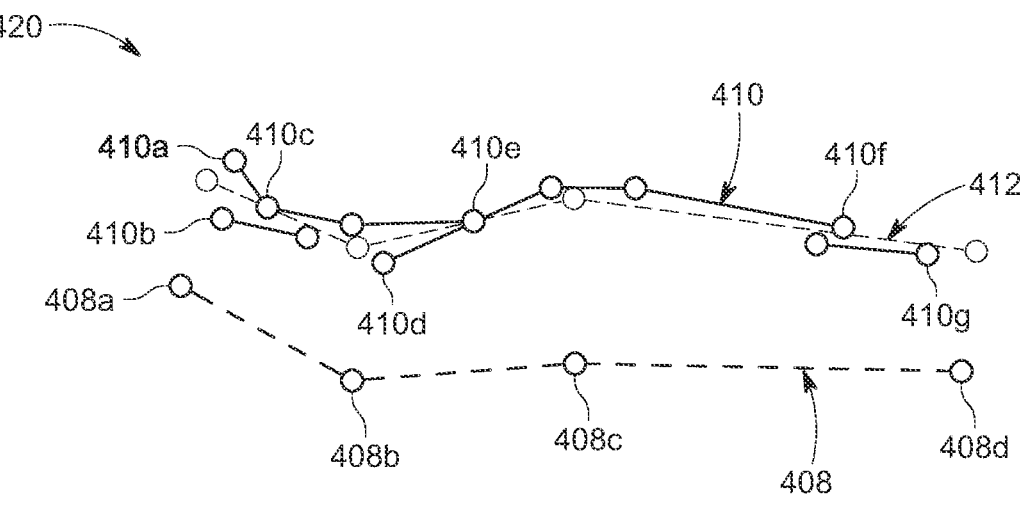
Figure 5A:
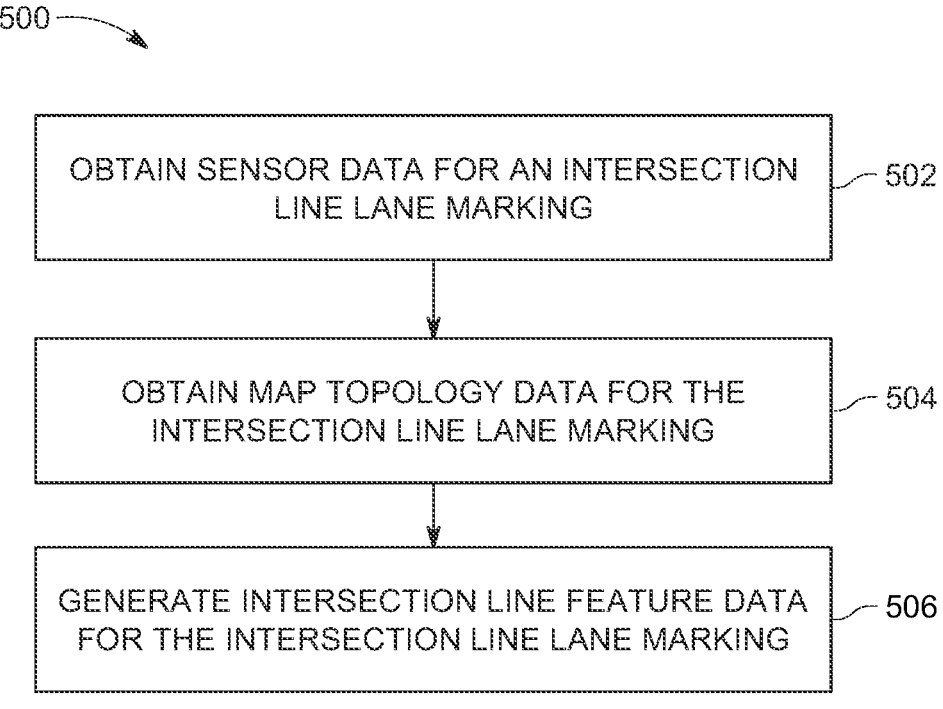
Figure 5B:
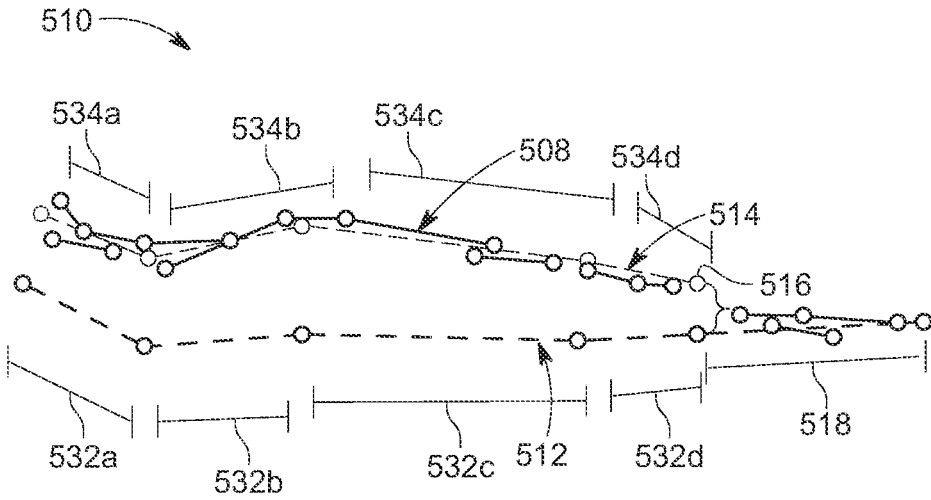
Figure 5C:
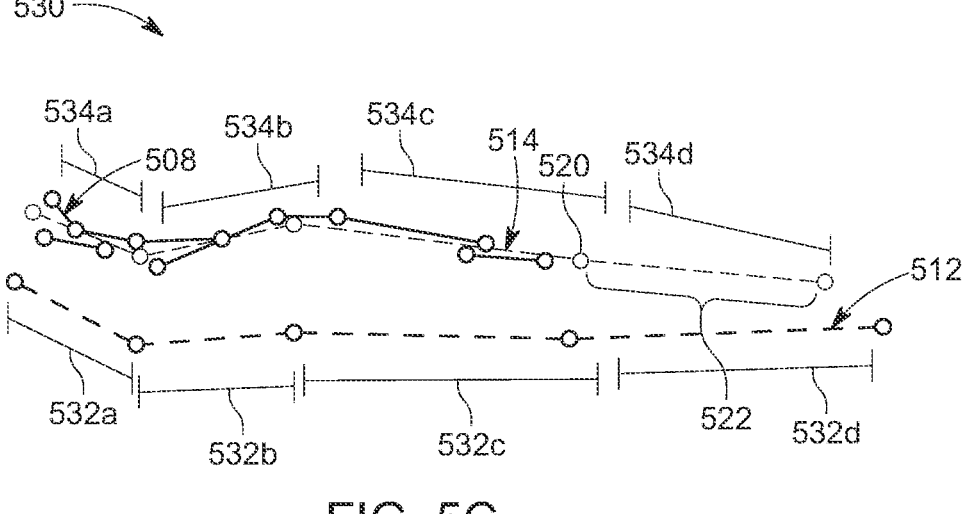
Figure 6B:
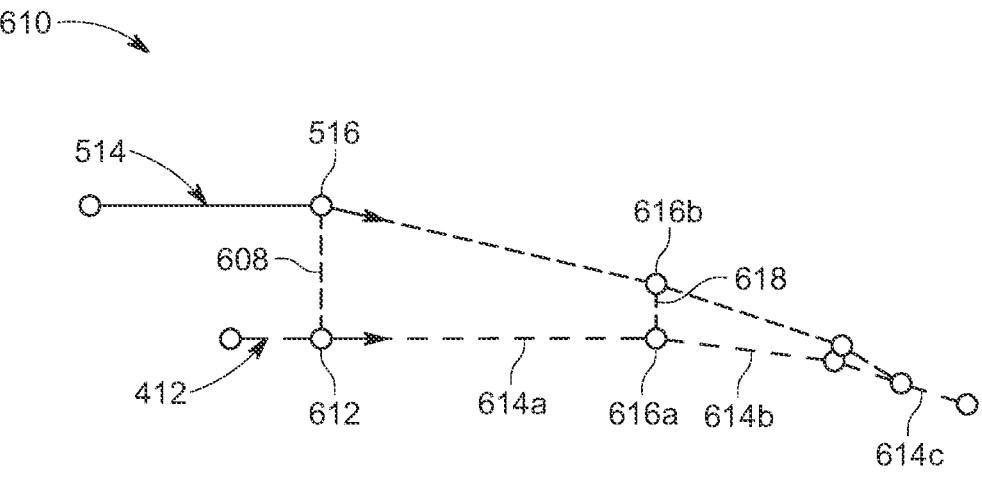
Figure 6C:
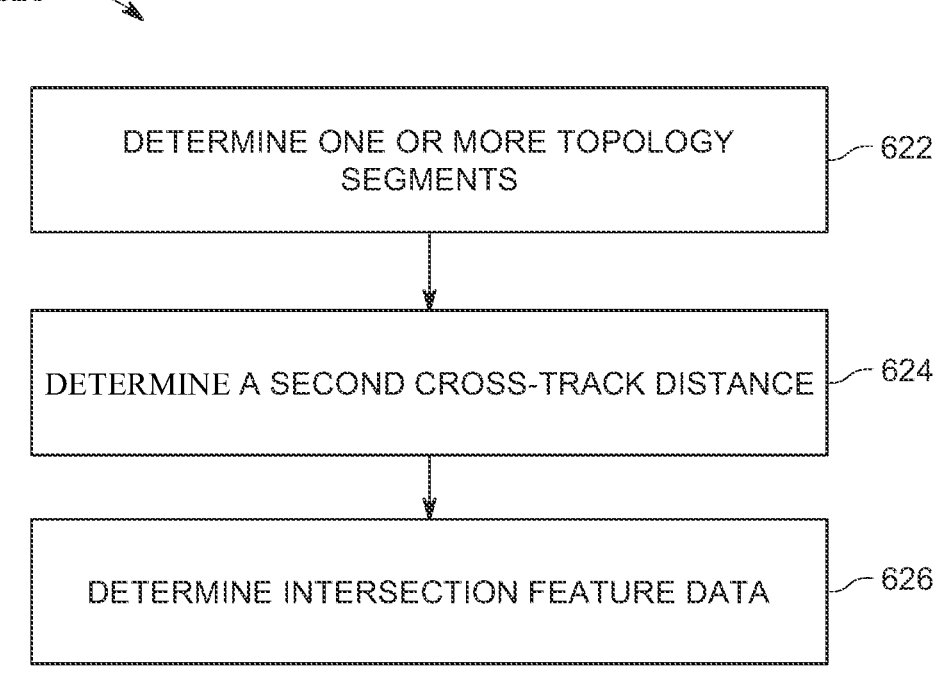
Figure 6D:
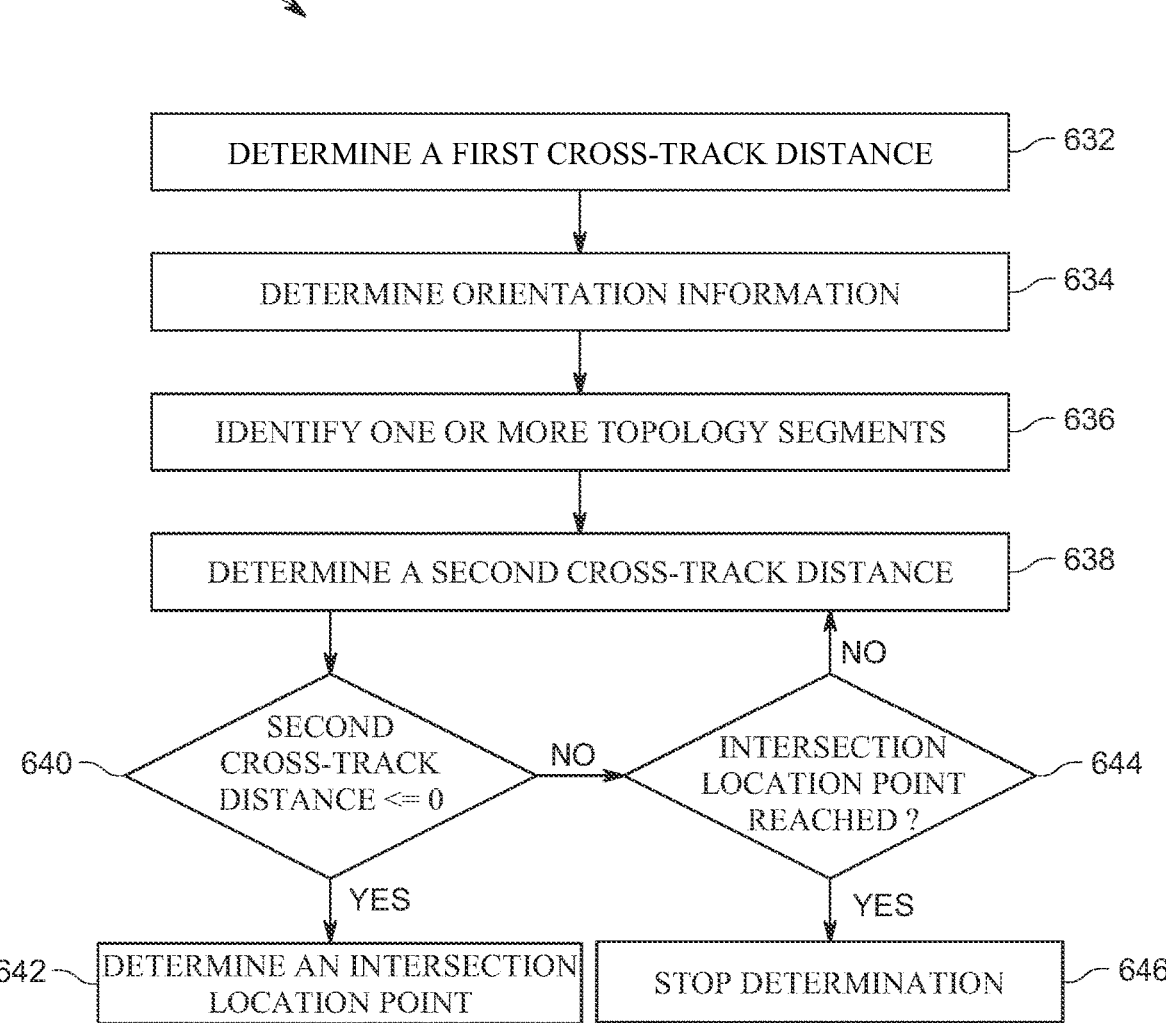
Figures 8A, 8B:
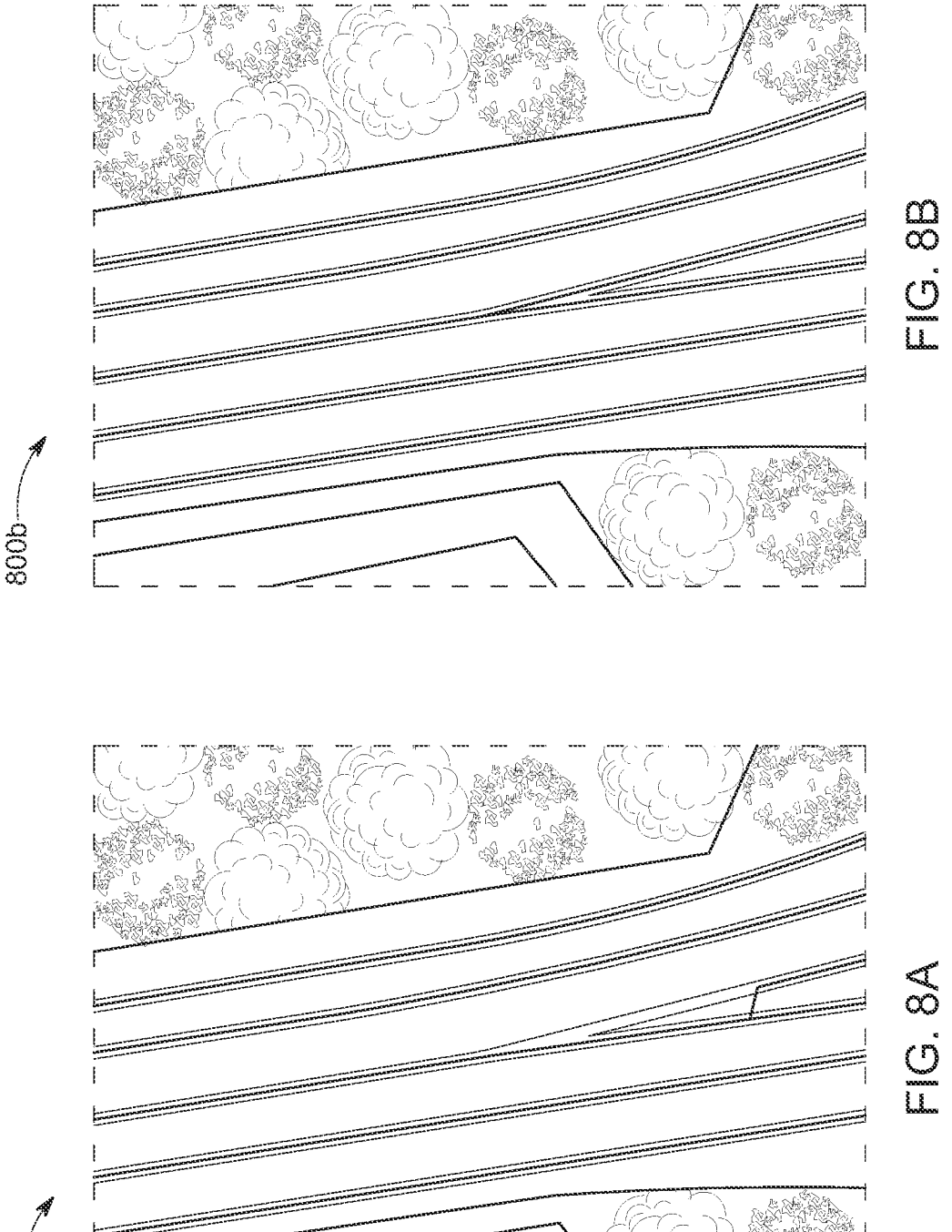

Having thus described example embodiments of the invention in general terms, reference will now be made to the accompanying drawings, which are not necessarily drawn to scale, and wherein:

FIG. 1 illustrates a block diagram of an example architecture of a system for determining intersection location data for an intersection location, in accordance with one or more example embodiments;

FIG. 2 illustrates different types of lane markings on a mapping interface, in accordance with one or more example embodiments;

FIG. 3 illustrates a block diagram associated with a system for determining intersection location data for an intersection location, in accordance with one or more example embodiments;

FIG. 4A illustrates a method for generating reference feature data for a reference lane marking, in accordance with one or more example embodiments;

FIG. 4B illustrates an example illustration of generation of a reference lane marking, in accordance with one or more example embodiments;

FIG. 5A illustrates a method for generating intersection line feature data for an intersection line lane marking, in accordance with one or more example embodiments;

FIG. 5B illustrates an example illustration of generation of an intersection line feature data based on a first restriction condition, in accordance with one or more example embodiments;

FIG. 5C illustrates an example illustration of generation of an intersection line feature data based on a second restriction condition, in accordance with one or more example embodiments;

FIG. 5D illustrates a method for generating intersection line feature data for a first topological segment, in accordance with one or more example embodiments;

FIG. 6A illustrates a method for generating intersection feature data for an intersection line lane marking, in accordance with one or more example embodiments;

FIG. 6B illustrates an example illustration of generation of intersection feature data, in accordance with one or more example embodiments;

FIG. 6C illustrates a method for generating intersection feature data for an intersection line lane marking, in accordance with one or more example embodiments;

FIG. 6D illustrates a high level method for generating intersection feature data for an intersection line lane marking, in accordance with one or more example embodiments;

FIG. 7 illustrates a flowchart of a method for determining intersection location data, in accordance with one or more example embodiments;

FIG. 8A illustrates an exemplary user interface showing lane marking data before using the systems and methods disclosed in accordance with one or more example embodiments; and FIG. 8B illustrates an exemplary user interface showing lane marking data after using the systems and methods disclosed in accordance with one or more example embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

As defined herein, a "computer-readable storage medium," which refers to a non-transitory physical storage medium (for example, volatile or non-volatile memory device), may be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "road" or "road network" may refer to a way leading a vehicle or traveler from one location to another. The road may have a single lane or multiple lanes.

The term "lane" may refer to a part of a road that is designated for travel of vehicles or pedestrians as per some condition.

The term "link" may refer to any connecting pathway including, but not limited, to a roadway, a highway, a freeway, an expressway, a lane, a street path, a road, an alley, a controlled access roadway, a free access roadway and the like.

The term "lane marking" may refer to a demarcation on a road or a link identifying a lane on the link. The lane marking may be associated with boundary lines of a lane on a link. The term "lane marking" is also interchangeably referred to as "feature line". The data associated with the lane marking is stored in a map database. The lane marking may be identified based on multiple sources such as sensors, satellite imagery and ground truth data.

The term "feature data" may refer to data indicative of parameters or features along a lane of a link represented by a corresponding link data record. In one example, the feature data of a lane marking may comprise features relating to a plurality of location points that, when connected, forms the lane marking. The feature data for a lane marking comprising of features of a series of location points may indicate, for example, latitude information, longitude information, geometry of lane, shape of the lane, size of the lane, width of the lane, link data record for the of the lane, intersection or node data record for the lane, etc. In an example, the feature data may form lane data record for identifying corresponding lane and generating the lane marking. The feature data may be stored in a map database. The feature data may also be indicative of various navigation related attributes, such as speed limit, traffic sign, etc. The various navigation related attributes associated with the lane may be included in a single lane data record or may be included in more than one type of records which are referenced to each other. For example, an HD lane data layer may be provided that associates lane marking of a lane or feature data of the lane with the respective link or road segments and/or other lanes or lane markings of the link. The term "feature data" is interchangeably referred to as "lane marking data" or "linear features".

End of Definitions

A system, a method, and a computer program product are provided for determining intersection location data for an intersection location. The conventional lane markings stored in the map database may be inaccurate and have incorrect information. These incorrect lane markings need to be corrected to provide enhanced and safe navigation in autonomous, semi-autonomous and manually-driven vehicles.

Various embodiments are provided herein for generating improved lane marking by correcting or improving feature data of lane markings, such that the improved lane marking represents lane geometry accurately. Specifically, the improved feature data is generated for an intersection line lane marking such that the improved intersection line lane marking precisely depicts a correct intersection location.

In various embodiments, to generate the improved intersection line lane marking, improved intersection line feature data until a first end location which is within a first distance threshold from the intersection location is used to determine improved intersection feature data. The improved intersection line feature data until the first end location is used with improved reference feature data relating to a reference lane marking which is associated with a lane marking, for example adjacent to the intersection line lane marking having the intersection location. The improved intersection line feature data and the improved intersection location data are used to generate the improved intersection line lane marking with accurate connecting point or marking for the intersection location.

FIG. 1 illustrates a block diagram 100 of an example architecture of a system 102 for determining intersection location data for an intersection location, in accordance with one or more example embodiments. As illustrated in FIG. 1, the block diagram 100 may comprise the system 102, a mapping platform 104, vehicles 106, lanes 108a, 108b and 108c (hereinafter also referred to as lanes 108a-108c), lane markings 110a, 110b, 110c, 110d, 110e, and 110f (hereinafter also referred to as lane markings 110a-110f), and a communication network 112. The mapping platform 104 may further comprise a map database 104a and a server 104b. The components described in the block diagram 100 may be further broken down into more than one component such as one or more sensors or application in user equipment and/or combined together in any suitable arrangement. Further, it is possible that one or more components may be rearranged, changed, added, and/or removed without deviating from the scope of the present disclosure.

In various embodiments, the system 102 may be onboard a vehicle, such as the system 102 may be a navigation system installed in the vehicle for detecting lane marking data and using this data for performing one or more navigation functions. In various embodiments, the vehicle may be an autonomous vehicle, a semiautonomous vehicle, or a manually operated vehicle. In some embodiments, the system 102 may be the server 104b of the mapping platform 104 and therefore may be co-located with or within the mapping platform 104. For example, the system 102 may be embodied as a cloud based service, a cloud based application, a cloud based platform, a remote server based service, a remote server based application, a remote server based platform, or a virtual computing system. In some other embodiments, the system 102 may be an OEM (Original Equipment Manufacturer) cloud. The OEM cloud may be configured to anonymize any data received from the system 102, such as the vehicle, before using the data for further processing, such as before sending the data to the mapping platform 104. In some embodiments, anonymization of data may be done by the mapping platform 104.

The vehicles 106 may be vehicles that have travelled on any of the lanes 108a-108c. The vehicles 106 may include one or more sensors, user equipment and/or a communication interface (not shown in the FIG. 1). The vehicles 106 may acquire lane marking data or feature data relating to the lanes 108a-108c. The sensors of the vehicles 106 may detect feature data at particular location points of lane markings 110a-110f of the lanes 108a-108c and transmit the feature data to the system 102. Such feature data acquired and transmitted by the vehicles 106 is referred to as sensor data, throughout the present disclosure. The number of lanes 108a-108c and geometry of the lanes 108a-108c depicted in the block diagram 100 is only exemplary and should not be construed as a limitation. As may be understood, the lane markings 110a-110f may form boundary demarcations for corresponding lanes 108a-108c. For example, boundaries of the lane 108a is identified by lane markings 110a and 110b, boundaries of the lane 108b is identified by lane markings 110c and 110d, boundaries of the lane 108c is identified by lane markings 110d and 110e, and so forth. Some lane markings may correspond to boundaries of two adjacent lanes, such as lane marking 110d forms a boundary for the lane 108b and a boundary for the lane 108c.

Further, the system 102 may be communicatively coupled with the mapping platform 104 and the vehicle 106 over the communication network 112.

The system 102 may communicate with the mapping platform 104, via the communication network 112, where the mapping platform 104 may comprise the map database 104a for storing map data, and the processing server 104b for carrying out the processing functions associated with the mapping platform 104.

In operation, the system 102 is configured to obtain reference feature data for a reference lane marking, depicted as the reference lane marking 110e. The reference lane marking 110e being associated with an intersection location 114. The system 102 may then generate intersection line feature data for an intersection line lane marking, depicted as the intersection line lane marking 110f, based on the reference feature data. The intersection line lane marking 110f has the intersection location 114. In an example, the intersection line lane marking 110f may split or merge at the intersection location 114. For example, the intersection line lane marking 110f may have a converging part that may converge with the reference lane marking 110e at the intersection location 114. The reference lane marking 110e is within a predefined proximity from the intersection line lane marking 110f. For example, the reference lane marking 110e is adjacent to the intersection line lane marking 110f. In an example, the intersection location 114 is formed between the reference lane marking 110e and the intersection line lane marking 110f The reference feature data for the reference lane marking 110e is used as reference to generate the intersection line feature data. The intersection line feature data extends until a predefined distance from the intersection location 114. In other words, the intersection line feature data is generated for a part of the intersection line lane marking 110f such that the part terminates at a predefined distance before the intersection location 114. For example, the intersection line feature data is generated for a linear part of the intersection line lane marking 110f and terminates before the converging part of the intersection line lane marking 110f.

The system 102 is configured to generate intersection feature data for the intersection line lane marking 110f based on the reference feature data and the intersection line feature data. The intersection feature data is associated with the intersection location 114. For example, the intersection feature data includes determined linear features for determined location points of the intersection line lane marking 110f between termination point or end point of the intersection line feature data and determined intersection location. Based on the reference feature data, the intersection line feature data and the intersection feature data, the system 102 may determine intersection location data for the intersection location 114. The intersection location data may include determined linear features associated with the intersection location 114. Based on the intersection location data, accurate connecting point for the intersection location 114 may be identified for improving the intersection line lane marking 110f. Based on the intersection line feature data upto the termination point (also referred to as a first end location, hereinafter), the intersection feature data between the first end location and the determined intersection location, and the intersection location data corresponding to the intersection location, an improved intersection line lane marking 110f may be generated. For example, the termination point may correspond to an end location point of a linear topological segment of the intersection line lane marking 110f before the starting of the converging part. The termination point on the intersection line lane marking 110f may be the predefined distance from the intersection location 114.

FIG. 2 illustrates an exemplary user interface 200 showing different types of lane markings on a mapping interface, in accordance with one or more example embodiments. The user interface 200 may be associated with one or more user equipment installed in a vehicle, such as the vehicles 106. The user interface 200 may be configured to display images about various navigation entities in the form of HD maps, where clarity and resolution of images is high (such as of the order of 320 dpi), and the information displayed about the navigation entities on the maps is collected using data sources beyond the on-board vehicle sensors only, to provide most accurate, up-to-date and real time map data. The accuracy of data is important, especially for maneuvering and control of autonomous vehicles. However, the lane markings depicted on the user interface 200 may not be accurate, i.e., the depicted lane markings may not conform to real or physical lanes markings of lanes on links.

For example, on the user interface 200, different lane markings are depicted. The lane marking 202 (referred to as intersection line lane marking, hereinafter) is having discontinuities as some parts are missing in the intersection line lane marking 202 making it appear dashed, rather than in the form of a continuous line on the user interface 200. Moreover, the intersection line lane marking 202 is not accurate as the lines or markings of the intersection line lane marking 202 do not conform to actual lane on road geometry. In this regard, a connection point 204 for an intersection location 206 present on the intersection line lane marking 202 is depicted incorrectly. The intersection line lane marking 202 may thus fail to give accurate information about lanes and road geometry through the user interface 200. Due to inaccurate lane markings, in certain cases, reaction time for a driver may be less. This may affect navigation on the road and may cause collisions.

In an example, on the user interface 200, other lane markings are depicted, such as lane markings 208 (also referred to as, reference lane marking 208), 210 and 212 relating to a link 214.

The purpose of the methods and systems (such as the system 102) disclosed herein, is to complete missing parts of incomplete lane markings, like the reference lane marking 208, intersection line lane marking 202, and other lane markings, and improve accuracy of inaccurate lane markings, such as by improving accuracy of lane markings 208, 210 and 212. In particular, the purpose of the methods and the system 102 disclosed herein is to improve accuracy of the connection point 204 for the intersection location 206 on the intersection line lane marking 202. The system 102 may then generate new lane markings that are complete and accurate and thus can be used reliably for navigation.

As already discussed, the lane markings, such as the lane markings 202, 208, 210 and 212 may have associated feature data or lane marking data stored in the map database 104a. Thus, when improved lane markings for the lane markings 202, 208, 210 and 212 are generated, the system 102 is also configured to update the map database 104a based on the generated improved lane markings and feature data associated with the improved lane marking. This ensures that the map data stored in the map database 104a is highly accurate and up-to-date. In some embodiments, the lane markings 202, 208, 210 and 212 are associated with a corresponding link 214, and data relating to the lane markings 202, 208, 210 and 212 may be stored in form of link data record for the link 214 or lane data record referenced to the link data record of the link 214, in the map database 104a.

FIG. 3 illustrates a block diagram 300 associated with the system 102 for determining intersection location data for an intersection location, in accordance with an embodiment disclosed herein.

The system 102 may include at least one processor 302, a memory 304, and at least one communication interface 306. The at least one processor 302 (referred to as processor 302, hereinafter) may be embodied in a number of different ways. In an example embodiment, the processor 302 may be in communication with the memory 304 via a bus for passing information among components of the system 102.

The processor 302 of the system 102 may be configured to determine the intersection location data for the intersection location 114, based on feature data and the map data. Further, based on the intersection location data for the intersection location 114, the processor 302 may generate or update the intersection line lane marking 110*f* having with the intersection location 114. The processor 302 may be further configured to update map database 104*a* and navigation instructions for travelling on a lane associated with the updated intersection line lane marking 110*f*.

The processor 302 is configured to determine reference feature data for the reference lane marking 208. The reference lane marking 208 is associated with the intersection location 206. In an example, the reference lane marking 208 may relate to a first lane on the link 214, such that the reference lane marking 208 is substantially parallel to its neighboring lane markings, such as the lane markings 210 and 212, on the link 214. In particular, the reference lane marking 208 may be closer to map topology, i.e., the reference lane marking 208 may closely demarcate a boundary of the first lane owing to simple and substantially linear geometry of the first lane. For example, the processor 302 may be configured to determine reference feature data based on sensor data and map topology data relating to the first lane. Moreover, the intersection location 206 lies on the reference lane marking 208. In another embodiment of the present disclosure, the processor 302 may obtain the reference feature data for the reference lane marking 208 from the map database 104*a*.

For example, the reference lane marking 208 is identified by checking a distance between the intersection line lane marking 202 and the reference lane marking 208. The reference lane marking 208 is within a predefined proximity or within a predefined distance from the intersection line lane marking 202. The reference lane marking 208 and the intersection line lane marking 202 may intersect at the intersection location 206. To this end, while the intersection line lane marking 202 originates or terminates at the intersection location 206, the intersection location 206 merely lies on the reference lane marking 208, for example, at an end of a topology segment of the reference lane marking 208. For example, the reference lane marking 208 may be adjacent to the intersection line lane marking 202. In such a case, the first lane relating to the reference lane marking 208 on the link 214 may be divided to form a second lane, such that the second lane is originating from or merging into the first lane at the intersection location 206 and the intersection line lane marking 202 and the reference lane marking 208 forms boundary of the second lane.

The intersection line lane marking 202 is disconnected and/or inaccurate. Owing to complex geometry of the intersection line lane marking 202 due to the presence of the intersection location 206, it may be far from the map topology, i.e., may fail to closely demarcate boundary of the second lane. The intersection line lane marking 202 may be more problematic, i.e., incorrect, discontinuous or inaccurate, in an area that is in vicinity of the intersection location 206. The complexities associated with the intersection location 206 may affect the accuracy of the intersection line lane marking 202.

There may be a number of reasons for the intersection line lane marking 202 to have gaps, duplicates, or incorrect geometries, especially near the intersection location 206. These may include, for example, incorrect data collection methods, hardware faults, partial occlusion, and conventional optimization techniques that use clustering logic that may group linear features near the intersection location 206.

As a result, the intersection location 206 may be incorrectly marked on the intersection line lane marking 202 and/or the reference lane marking 208.

To improve the intersection line lane marking 202, the processor 302 may start optimization process for improving the intersection line lane marking 202 from an area that is far from the intersection location 206. In this regard, the processor 302 is configured to generate intersection line feature data for the intersection line lane marking 202 based on the reference feature data. The processor 302 is configured to generate the intersection line feature data by applying a restriction condition. The restriction condition may be associated with the intersection location 206. Based on applying the restriction condition, the processor 302 is configured to generate the intersection line feature data upto a first end location on the intersection line lane marking 202. The first end location is within a first distance threshold from the intersection location 206. In other words, the processor 302 is configured to stop the generation of the intersection line feature data at the first end location, when the first end location is away from the intersection location 206 by the first distance threshold. In this manner, improved feature data, i.e., the intersection line feature data for the intersection line lane marking 202 is generated for the area that is away from the intersection location 206.

In an example, the processor 302 may generate the intersection line feature data based on sensor data and map topology data relating to the second lane associated with the intersection line lane marking 202. In an example, the processor 302 may obtain the sensor data from one or more sensors on-board vehicles, such as the vehicles 106, probe vehicles, etc. Moreover, the processor 302 may obtain the map topology data from the map database 104*a* and/or other images relating to the link 214. The map topology data may be obtained from, for example, lane data record, link data records, satellite images, bird's-eye-view images, and so forth. Further, the processor 302 may initialize a line constructor for generating the intersection line feature data based on the sensor data and the map topology data (collectively referred to as, raw data for the intersection line lane marking) where the reference feature data is set as benchmark for the line constructor. The line constructor is initialized with the restriction condition to stop the generation of the intersection line feature data at the first end location before the intersection location 206.

Thereafter, the processor 302 is configured to improve feature data or linear features of an area around the intersection location 206. In this regard, the processor 302 is configured to generate intersection feature data for the intersection line lane marking 202 based on the reference feature data and the intersection line feature data. As may be understood, the intersection line feature data is generated till the first end location. To this end, the intersection feature data is generated for the intersection line lane marking 202 after the first end location. In an example, the processor 302 is configured to generate the intersection feature data based on a first cross-track distance between the first end location and a reference matched location on the reference lane marking 208, orientation information associated with the reference matched location of the reference lane marking 208 and the first end location of the intersection line lane marking 202, and one or more determined second cross-track distance between different topology segments of the reference lane marking 208 and corresponding estimate matched point on the intersection line lane marking 202.

Based on the intersection feature data, the processor 302 is configured to determine intersection location data for the intersection location 206. For example, the intersection location data may include linear features of a location point that is identified as an improved marking or connection point for the intersection location 206. From the intersection feature data, accurate connection point for the intersection location 206 is determined. Based on the determined connection point of the intersection location 206, the intersection feature data and the intersection line feature data, the intersection line lane marking 202 is improved.

FIG. 4A illustrates a method 400 for generating reference feature data for the reference lane marking 208, in accordance with an embodiment. The reference feature data may include linear features associated with a plurality of location points on the reference lane marking 208. The reference lane marking 208 is closer to map topology or real lane geometry of a boundary of the first lane owing to, for example, simple geometry without a converging area. The quality of the linear features of the reference lane marking 208, i.e., linear features that are not near the intersection location 206 are improved first as such linear features have less duplication or incorrect geometry than linear features of or in close proximity to the intersection location 206.

The feature data for a location point may include, but is not limited to, latitude information, longitude information, neighboring or connected location point information, geometry related data, shape data, link data, intersection or node data, altitude data, length data, position data, orientation data, curvature data, yaw data, pitch data, roll data, traffic related data, or a combination thereof.

At 402, sensor data relating to the reference lane marking 208 is obtained. The sensor data may be obtained from, for example, sensors on-board vehicles, sensors installed in vicinity of the first lane, sensors associated with probes or devices travelling across the first lane for gathering data, etc. For example, the sensor data may include linear features, such as location information, shape, structure, geometry, elevation information, speed limit, traffic-related information, etc. relating to plurality of location points of the reference lane marking 208. The sensor data may be discontinuous and inaccurate. Moreover, owing to collection of sensor data from different data sources, the sensor data may include duplicates and/or incorrect geometries for location points of the reference lane marking 208.

At 404, map topology data relating to the reference lane marking 208 is obtained. The map topology data may indicate real geometry of the first lane. For example, the map topology data may indicate the boundary of the first lane corresponding to the reference lane marking 208. In an example, the map topology data may be associated with satellite imagery, bird's eye view data, and so forth. The geometry of the boundary of lanes indicated by the map topology data may not be accurate but reflect linear features or feature data of real geometry of the first lane and/or the link 214.

At 406, the reference feature data is generated for the reference lane marking 208. The reference feature data is generated based on the sensor data and the map topology data. Embodiments of the FIG. 4A is explained in detail in conjunction with FIG. 4B.

FIG. 4B illustrates an example illustration 420 of generation of the reference lane marking 208, in accordance with an embodiment. In an example, a first feature line 408 for the reference lane marking 208 may be generated based on the map topology data. Moreover, a second feature line 410 for the reference lane marking 208 may be generated based on the sensor data. In an example, the second feature line 410 may be generated by merging sensor data from a plurality of data sources.

Further, a benchmark line constructor may be initialized without any restriction to generate a first resultant feature line 412 based on the linear features of location points (depicted as location points 408a, 408b, 408c and 408d) indicated by the first feature line 408 and linear features of location points (depicted as location points 410a, 410b, 410c, 410d, 410e, 410f and 410g) indicated by the second feature line 410. In an example, the benchmark line constructor may initialize one or more new instances of line class based on a benchmark. In other words, the benchmark line constructor generates a line or points for the line based on a benchmark. Pursuant to present disclosure, the benchmark is the first feature line 408 or the reference lane marking 208 and the second feature line 410. The benchmark line constructor generates the first resultant feature line 412 or points for the first resultant feature line 412 based on the intersection lane marking data and the reference feature data.

For example, the benchmark line constructor may determine location data and orientation data for each topology segment for the first resultant feature line 412, based on the first feature line 408 and the second feature line 410. In an example, location and orientation of linear features of the first feature line 408 and the second feature line 410 may be used to determine the location data and orientation data for constructing the first resultant feature line 412. The first resultant feature line 412 corresponds to the reference lane marking 208 where features of location points of the first resultant feature line 412 corresponds to the reference feature data. The reference lane marking 208 may represent a boundary of the first lane more accurately. In this manner, the reference lane marking 208 is improved.

The benchmark line constructor is initialized without any restriction in terms of total length of completion and correction. The benchmark line constructor may work along entire length of the reference lane marking 208 without updating features relating to the intersection location 206. For example, the benchmark line constructor may also be used for the lane markings 210 and 212, to improve feature data or linear features of such lane markings 210 and 212. The reference feature data (i.e., the improved linear features) of the reference lane marking 208 is then used as benchmark or reference for improving linear features of the intersection line lane marking 202. A manner in which the reference feature data is used to improve the intersection line lane marking 202 is described in conjunction with the following FIG. 5A-FIG. 5D and FIG. 6A-FIG. 6D.

FIG. 5A illustrates a method 500 for generating intersection line feature data for an intersection line lane marking, in accordance with an embodiment. The intersection line lane marking 202 may relate to a second lane that may originate from or terminate at the intersection location 206. For example, the first lane having a boundary indicated by the reference lane marking 208 may be divided to form the second lane such that the reference lane marking 208 and the intersection line lane making connect at the intersection location 206.

The intersection line feature data may include linear features associated with a plurality of location points on the intersection line lane marking 202. The intersection line lane marking 202 is far or more inconsistent from a map topology or real lane geometry of a boundary of the second lane owing to, for example, presence of a converging area with the intersection location 206. The quality of the linear features of the intersection line lane marking 202, i.e., linear features that lie on the intersection line lane marking 202 and are related to the intersection location 206 is improved in two steps. In a first step, linear features or feature data of a part of the intersection line lane marking 202 that are farther from the intersection location 206 is improved. The present step in explained in conjunction with FIGS. 5A-5D.

At 502, sensor data relating to the intersection line lane marking 202 is obtained. The sensor data may be obtained from, for example, sensors on-board vehicles, sensors installed in vicinity of the second lane, sensors associated with probes or devices travelling across the second lane for gathering data, etc. The sensor data may be discontinuous, inaccurate and may include duplicates and/or incorrect geometries.

At 504, map topology data relating to the intersection line lane marking 208 is obtained. The map topology data may indicate real geometry of the second lane. For example, the map topology data may indicate the boundary of the second lane corresponding to the intersection line lane marking 202. In an example, the map topology data may be associated with satellite imagery, bird's eye view data, and so forth. The geometry of the boundary of lanes indicated by the map topology data may not be accurate but reflect linearity features of real geometry of the second lane and/or the link 214.

At 506, the intersection line feature data is generated for the intersection line lane marking 208. The intersection line feature data is generated based on the sensor data, the map topology data, the reference feature data and a restriction condition. The restriction condition is associated with the intersection location 206. Embodiments of the step 506 are explained in detail in conjunction with FIGS. 5B and 5C.

FIG. 5B illustrates an example illustration 510 of generation of the intersection line feature data based on a first restriction condition, in accordance an embodiment. Further, FIG. 5C illustrates an example illustration 530 of generation of the intersection line feature data based on a second restriction condition, in accordance with an embodiment In this regard, a third feature line 508 for the intersection line lane marking 202 may be generated based on the sensor data and the map topology data. Moreover, a fourth feature line 512 for the reference lane marking 208 may be generated based on the improved reference feature data. For example, the fourth feature line 512 may correspond to the first resultant feature line 412. As may be noted, the third feature line 508 and the fourth feature line may have different topological segments. As depicted, the fourth feature line 512 corresponding to the reference lane marking 208 may have topological segments 532a, 532b, 532c and 532d (hereinafter referred to as topological segments 532a-532d). Moreover, the third feature line 508 for the intersection line lane marking 202 may have topological segments 534a, 534b, 534c and 534d (hereinafter referred to as topological segments 534a-534d). For example, linear features of each of the topological segments 534a-534d may be improved based on linear features of corresponding topological segments 532a-532d.

For example, a first topological segment 534a in the intersection line lane marking 202 or the third feature line 508 may be identified, based on corresponding location data, location points and shape points. Moreover, the first topological segment 532a may also be identified in the reference lane marking 208 or the fourth feature line 512 based on location data, location points and shape points associated with the fourth feature line 512. The improved features for the first topological segment 534a of the intersection line lane marking 202 are generated based on the features of the first topological segment 532a of the reference lane marking 208.

Continuing further, the improved reference feature data or the fourth feature line 512 is used as a benchmark or reference to improve linear feature or feature data of a part of the intersection line lane marking 202 that is farther away from the intersection location 206. In an example, a benchmark line constructor may be initialized under certain restriction to generate a second resultant feature line 514.

Referring to FIG. 5B, given the bad quality of feature data for the intersection line lane marking 202 associated with the intersection location 206, the benchmark line constructor should be stopped before reaching the intersection to avoid over completion and correction. To overcome the said problem, the benchmark line constructor may be initialized based on the first restriction condition associated with the intersection location 206. For example, the first restriction condition comprises a restriction to extend the intersection line feature data upto a first distance threshold 518 from the intersection location 206. Therefore, the benchmark line constructor may stop generation of the second resultant feature line 514 at a first end location 516, such that the first end location 516 is first distance threshold 518 away from the intersection location 206. The second resultant feature line 514 indicates the improved intersection line feature data for a part of the intersection line lane marking 202.

Referring to FIG. 5C, in case of absence of feature data or lack of linear features for the intersection line lane marking 202 associated with the intersection location 206, the benchmark line constructor should be stopped if there is no input data (such as sensor data and/or map topology data) within a certain distance to avoid inaccurate assumptions. To overcome the said problem, the benchmark line constructor may be initialized based on the second restriction condition. For example, the second restriction condition comprises a restriction to generate the intersection line feature data upto a second distance threshold 522 from an end sensor data 520 for the intersection line lane marking 202. In other words, if there is no observation or feature data or linear feature after a location point 520 of the intersection line lane marking 202, then the benchmark line constructor may be stopped after the second distance threshold 522 from the location point 520. It may be noted that the location point 520 may correspond to the end sensor data or end sensor observation. Subsequently, the second resultant feature line 514 is generated upto the second distance threshold 522 from the location point 520. The second resultant feature line 514 indicates the improved intersection line feature data for a part of the intersection line lane marking 202.

It may be noted that the second distance threshold 522 from the location point 520 may also lie before the intersection location 206 area to finish the generation of the second resultant feature line 514 first distance threshold 518 away from the intersection location 206.

It may be noted that besides the first restriction condition and the second restriction condition, there may be many more similar restriction conditions applied on the benchmark line constructor. However, all other restriction conditions may operate in conjunction with the first restriction condition to stop the generation of the intersection line feature data before the intersection location 206 area. For example, other restriction conditions may relate to, but are not limited to, elevation feature change, aerial image feature change and linear feature property change.

FIG. 5D illustrates a method 540 for generating intersection line feature data for a first topological segment 534a, in accordance with one or more example embodiments. In an example, the first topological segment 534a may be indicated by a polyline connecting two nodes or points or locations. For example, the first topological segment 534a may have additional shape points connected by the polyline. The nodes and the shape points may have associated location data, such as latitude and longitude positioning. For example, location points of the intersection line lane marking 202 having corresponding feature data or linear features may be identified based on location data of the nodes and the shape points. Further, the identified topological segments 534a-534d, specifically, location points within a topological segment 534a-534d may have related feature data or linear features. Such feature data may be stored within the map database 104a.

For example, the benchmark line constructor may identify a first topological segment 534a in the intersection line lane marking 202, based on corresponding location data, location points and shape points. Moreover, the first topological segment 532a may also be identified in the reference lane marking 208 based on location data, location points and shape points associated with the fourth feature line 512. The improved features for the first topological segment 534a of the intersection line lane marking 202 are generated based on the features of the first topological segment 532a of the reference lane marking 208.

At 524, heading information for the first topological segment 534a of the intersection line lane marking 202 is determined. Based on the sensor data and the map topology data for the intersection line lane marking 202 and the reference lane marking 208, the heading information for location points within the first topological segment 534a of the intersection line lane marking 202 may be determined. In an example, location data, nodes and shape points associated with the first topological segment 534a of the third feature line 508 and the fourth feature line 512 may be determined to determine the heading information for the first topological segment 534a. For example, the heading information may include, but is not limited to, a heading direction, a heading difference and a heading angle.

At 526, location information for the first topological segment 534a is determined. Based on the sensor data and the map topology data for the intersection line lane marking 202 and the reference lane marking 208, the location information for location points within the first topological segment 534a may be determined. In an example, location data, nodes and shape points associated with the first topological segment 534a and 532a of the third feature line 508 and the fourth feature line 512 may be determined to determine the location information for the first topological segment 534a. For example, the location information may include, but is not limited to, an altitude, latitude and a longitude.

At 528, the intersection line feature data for the first topological segment 534a is generated based on a comparison between the reference lane marking 208 and the intersection line lane marking 202. In this regard, the determined heading information for the first topological segment 534a of the intersection line lane marking 202 is compared with heading information for the corresponding first topological segment 532a of the reference lane marking 208. In this manner, a heading difference may be determined between the first topological segment 534a in the intersection line lane marking 202 and first topological segment 532a in the reference lane marking 208. In addition, the location information for the first topological segment 534a of the intersection line lane marking 202 may be compared with location information for the first topological segment 534a of the reference lane marking 208. Based on the comparison of the location information, location information for the location points and/or shape points of the intersection line lane marking 202 may be determined. Thereafter, the heading information, the location information, the heading difference and the location difference may be used to generate the intersection line feature data associated with location points in the first topological segment 534a of the intersection line lane marking 202.

In this manner, the intersection line feature data may be generated for different topological segments 534a-534d of the intersection line lane marking 202. The intersection line feature data of the intersection line lane marking 202 extends upto the first end location 516 which is within the first distance threshold 518 from the intersection location 206. Once the improved intersection line feature data for the part of the intersection line lane marking 202 that is far from the intersection location 206 is generated, feature data for an area associated with the intersection location 206 may be improved in the next step for improving the intersection line lane marking 202.

Given the completed and corrected reference feature data for the reference lane marking 208 and the intersection line feature data for the intersection line lane marking 202, the second step is to determine the intersection location 206 accurately. In this regard, instead of line-line connection between the reference feature data and the intersection line feature data, a curvature connection is used. The curvature connection involves two or more topology segments and needs a loop to gradually construct intersection feature data and determine an intersection location point for the intersection location 206.

FIG. 6A illustrates a method 600 for generating intersection feature data for the intersection line lane marking 202, in accordance with an embodiment. The intersection feature data may be generated for an area extending from the first end location 516 till the intersection location 206. The intersection feature data comprises a set of location points having associated feature data or linear features. The intersection feature data may include feature data for an intersection location point relating to the intersection location 206. For example, the intersection feature data for location points after the first end location 516 may be determined in an iterative manner until the intersection location point for the intersection location 206 is determined.

At 602, a first cross-track distance between the first end location 516 and a reference matched location on the reference lane marking 208 is determined. In an example, the reference matched location is identified on the reference lane marking 208 by extending a perpendicular from the first end location 516 to the reference lane marking 208. For example, the first cross-track distance may correspond to a perpendicular distance between the reference lane marking 208 and the intersection line lane marking 202, at the first end location 516. In an example, map matching techniques may be used for determining the first cross-track distance.

At 604, orientation information is determined for the first end location 516 and the reference matched location. The orientation information may indicate a direction or orientation of the first end location 516 of the intersection line lane marking 202 with respect to the reference lane marking 208.

At 606, the intersection feature data is determined. The intersection feature data is determined based on the first cross-track distance and the orientation information. For example, if the orientation information indicates that the first end location 516 and the reference matched location have a same orientation or direction and the first cross-track distance is greater than zero, the intersection feature data for the intersection line lane marking 202 may be generated from the first end location 516 towards the determined direction to determine the intersection location point.

FIG. 6B illustrates an example illustration 610 of generation of intersection feature data, in accordance with an embodiment. In an example, the intersection feature data for the intersection line lane marking 202 is determined based on the first resultant feature line 412 associated with the reference feature data, and the second resultant feature line 514 associated with the intersection line feature data. In particular, a first cross-track distance 608 is determined between the first end location 516 and a reference matched location 612. Moreover, orientation information is determined for the first end location 516 and the reference matched location 612. Based on the first cross-track distance 608 and the orientation information, the intersection feature data may be determined.

In an example, one or more topology segments (depicted as topology segments 614a, 614b and 614c) of the first resultant feature line 412 of the reference lane marking 208 may be identified for determining the intersection feature data. The steps for determining the intersection feature data is described in more detail in conjunction with FIG. 6C.

FIG. 6C illustrates a method 620 for generating intersection feature data for the intersection line lane marking 202, in accordance with an embodiment. It may be noted that at the intersection line feature data or the second resultant feature line 514 ends at the first end location 516 before the intersection location 206, while the improved reference feature data or the first resultant feature line 412 may be determined for entire length of the reference lane marking 208. To this end, after the first end location 516, feature data of the intersection line lane marking 202 is improved based at least on feature data of a length of the reference lane marking 208 corresponding to a length between the first end location 516 and the intersection location 206.

At 622, one or more topology segments of the reference lane marking 208 are identified. The one or more topology segments 614a, 614b and 614c may start after the reference matched location 612 on the first resultant feature line 412 of the reference lane marking 208. For example, each of the one or more topology segments 614a, 614b and 614c may have associated location points. For example, the one or more topology segments 614a, 614b and 614c may be identified based on location data, nodes and shape points associated with the location points of the reference lane marking 208 or the first resultant feature line 412.

At 624, a second cross-track distance (depicted as a second cross-track distance 618 in FIG. 6B) is determined between a second end location of a topology segment and an estimate matched point on the intersection line lane marking 202. The topology segment may be a topology segment from the one or more topology segments 614a, 614b and 614c of the reference lane marking 208. The estimate matched point is identified by extending an estimated perpendicular from the second end location to the intersection line lane marking 202 or an estimated extension of the second resultant feature line 514. For example, the topology segment may be the topology segment 614a. The second cross-track distance 618 is determined from a second end location 616 of the topology segment 614a on the reference lane marking 208 to an estimate matched point 618 on the estimated extension of the second resultant feature line 514.

At 626, the intersection location data for the intersection location 206 is determined. The intersection location data is determined based on the second cross-track distance 618. In particular, the second end location 616 and the corresponding estimate matched point 618 may be identified to correspond to the intersection location data when the second cross-track distance 618 is less than a predefined threshold. For example, if the second cross-track distance 618 between the second end location 616 and the estimate matched point 618 is very small, such as zero, the estimate matched point 618 may be identified as intersection location. Subsequently, feature data of the estimate matched point 618 may be determined as the intersection location data. The intersection location data comprises an intersection location point for the intersection location 206.

It may be noted that such second cross-track distance 618 between the end location 616 of a topology segment 614a of the reference lane marking 208 and corresponding estimate matched point 618 may be determined iteratively until a second cross-track distance less than the predefined threshold is obtained. In such case, an estimate matched point corresponding to the second cross-track distance less than the predefined threshold may be identified as the intersection location point.

FIG. 6D illustrates a high level method 630 for generating intersection feature data for the intersection line lane marking 202, in accordance with an embodiment.

At 632, the first cross-track distance 608 between the first end location 516 and the reference matched location 612 on the reference lane marking 208 is determined. The first end location 516 corresponds to an end location point based on the intersection line feature data; such that the first end location 516 is a first distance threshold 518 away from the intersection location 206.

At 634, orientation information between the first end location 516 and the reference matched location 612 is determined.

At 636, one or more topology segments 614a, 614b and 614c of the reference lane marking 208 are identified. The one or more topology segments 614a, 614b and 614c are identified in a direction of the intersection location 206 and after the reference matched location 612.

At 638, the second cross-track distance 618 is determined between the second end location 616 of the topology segment 614a from the one or more topology segments and the estimate matched point 618 of the intersection line lane marking 202 or an estimate extension of the second resultant feature line 514. For example, the topology segment 614a may end at a location point corresponding to the second end location 616.

At 640, a determination is made to check if the second cross-track distance 618 is equal to or less than zero. In this case, if the second cross-track distance 618 is equal to or less than zero, an intersection location point is determined at 642. In this regard, if the second cross-track distance 618 is equal to or less than zero, the second end location 616 and/or the estimate matched point 618 may be identified as intersection location point.

If, at 640, the second cross-track distance 618 is equal to or less than zero, the method 630 proceeds to 644. At 644, a determination is made to check if an end of the intersection location point has been reached. If yes, at 646, it is considered that the intersection location point has been successfully determined and the method 640 ends.

However, if it is determined, at 640, that the end of the intersection location point has not been reached, the method may go back to 638. In such a case, another second cross-track distance is determined between an end location point of another topology segment, such as the topology segment 614b, and corresponding estimate matched point on the extension of the second resultant feature line 514. The process of determining second cross-track distance between an end location of a topological segment and corresponding estimate matched point is performed till a second cross-track distance less than or equal to 0 is obtained. In an example, an end location of a topological segment and corresponding estimate matched point having second cross track distance equal to 0 may be identified as intersection location point and features of the end location and the estimate matched point may form the intersection location data.

FIG. 7 illustrates a flowchart of a method 700 for determining intersection location data, in accordance with an embodiment. The method 700 will be discussed in conjunction with above-described FIG. 1-FIG. 6, and appropriate references may be used interchangeably wherever required, without deviating from the scope of the present disclosure.

The method 700 comprises, at step 702, obtaining reference feature data for the reference lane marking 208. The reference lane marking 208 is associated with the intersection location 206. The reference feature data may include improved linear features of the reference lane marking 208, such that the reference lane marking 208 generated based on the reference feature data conforms more closely to the map or road geometry. In one example, the processor 302 may generate the reference feature data. In another example, the processor 302 may obtain the reference feature data from the map database 104a. The steps of generating the reference feature data is explained in detail in conjunction with FIGS. 4A and 4B.

The method 700 comprises, at step 704, generating intersection line feature data for the intersection line lane marking 202 based on the reference feature data. The intersection line lane marking 202 has the intersection location 206. For example, the intersection line lane marking 202 has a converging area and the intersection line lane marking 202 originates or terminates at the intersection location 206. Due to complex geometry of the intersection line lane marking 202, the intersection line lane marking 202 may be far from the map topology of road geometry. The intersection line lane marking 202 may thus have to be improved to enhance accuracy and reliability of the intersection line lane marking 202. The reference lane marking 208 is within a predefined proximity from the intersection line lane marking 202. For example, the intersection line lane marking 202 originates or terminates at an intersection location point on the reference lane marking 208.

For example, the intersection line lane marking 202 is improved in a two-step manner. At first, the processor 302 may improve feature data of an area that is away from the intersection location 206. The processor 302 may generate the intersection line feature data with the reference feature data used as a benchmark. The intersection line feature data is generated with a restriction condition, for example, where the restriction condition stops generation of the intersection line feature data at the first end location 516 which is a first distance threshold 518 away from the intersection location 206. The steps for generation of the intersection line feature data for the intersection line lane marking 202 is described in detail in conjunction with FIGS. 5A-5D.

The method 700 comprises, at step 706, generating intersection feature data for the intersection line lane marking 202 based on the reference feature data and the intersection line feature data. In particular, once a part of the intersection line lane marking 202 away from the intersection location 206 is updated, in next step, feature data for an area close to the intersection location 206 is updated. In this regard, the processor 302 may determine the intersection feature data from the first end location 516 upto the intersection location 206. The processor 302 may determine the first cross-track distance 608 between the first end location 516 and the reference matched location 612 on the reference lane marking 208, orientation information between the first end location 516 and the reference matched location 612, and the one or more topology segments 614a, 614b and 614c of the reference lane marking 208 after the reference matched location 612. The processor 302 may then determine the second cross-track distance 618 between the second end location 616 of the topology segment 614a and the estimate matched point 618 perpendicular to the second end location 616 on the intersection line lane marking 202. The steps for generation of the intersection feature data for the intersection line lane marking 202 is described in detail in conjunction with FIGS. 6A-6D.

The method 700 comprises, at step 708, determining intersection location data for the intersection location 206 based on the reference feature data, the intersection line feature data and the intersection feature data. In particular, the intersection feature data may include different estimate matched points extending from end locations of different topology segments of the reference lane marking 208. The intersection feature data is determined by using the reference feature data as benchmark. Further, the intersection feature data comprises an intersection location point corresponding to the intersection location 206. As described above in FIGS. 6A-6D, the intersection location data for the intersection location point is determined based on the second cross-track distance between the second end location and the estimate matched point. At a point where the second cross-track distance is less than or equal to zero, the intersection location point may be identified. Feature data corresponding to the intersection location point is determined as the intersection location data.

Based on the intersection line feature data, the intersection feature data and the intersection location data, the intersection line lane marking 202 may be updated. The updated intersection line lane marking may conform closely to road geometry or map topology of the second lane having the converging area and the intersection location 206. Moreover, data relating to the updated intersection line lane marking may be stored in the map database 104a to assist in navigation. The updated intersection line lane marking may be associated with lane markings on a link, so updating the map database 104a may further comprise updating lane level records, link level records and road geometry level records and even node level records for accuracy.

It will be understood that each block of the flow diagram of the method 700 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by the memory 304 of the system 102, employing an embodiment of the present invention and executed by the processor 302. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram 700 support combinations of means for performing the specified functions and combinations of operations for performing the specified functions. It will also be understood that one or more blocks of the flow diagram 700, and combinations of blocks in the flow diagram 700, may be implemented by special purpose hardware-based computer systems which perform the specified functions, or combinations of special purpose hardware and computer instructions.

Further using the methods described in the accompanying embodiments of the flowchart 700 shown in FIG. 7, which implement the various functionalities of the system 102 described in FIG. 3, the accuracy of the map data may be highly improved. This is specifically advantageous in cases of map data related to lane markings, which may have discontinuities, inaccuracy and duplicates due to any of the reasons discussed previously. This is particularly useful for high definition maps which are used for autonomous driving vehicles, as the system 102 improves the quality of map data stored in map database 104a, thereby leading to more accurate, safe and reliable decision making for autonomous driving scenarios.

FIG. 8A illustrates an exemplary user interface showing lane marking data displayed on the mapping display 900a of a high-definition map (associated with map database 104a) installed in a vehicle before using the systems and methods disclosed in accordance with one or more example embodiments. As can be observed from the mapping display 900a, there are discontinuities and inaccuracy in the lane marking data.

Further, FIG. 8B illustrates the exemplary user interface showing lane marking data on a mapping display 800b of the high-definition map (associated with map database 104a) after using the systems and methods disclosed in accordance with one or more example embodiments. As can be clearly observed, there are no discontinuities in the lane marking data on the mapping display 800b and the lane marking data accurately depicts an intersection location thereby showing efficacy, accuracy and usefulness of the methods and system disclosed in the various embodiments described herein. Further, when the vehicle associated with the mapping display 800b is an autonomous vehicle (that is capable of sensing its environment and operating without human involvement), the safety and reliability of navigation of the autonomous vehicle is highly improved and better maneuvering and control of the autonomous vehicle may be possible.

Additionally, the vehicle may include a motor vehicle, a non-motor vehicle, an automobile, a car, a scooter, a truck, a van, a bus, a motorcycle, a bicycle, a Segway, and/or the like. The vehicle may be a semiautonomous vehicle, or even a manual vehicle.

In some embodiments, the system 102 may comprise one or more user equipment for example as a part of an in-vehicle navigation system, a navigation app in a mobile device and the like. In each of such embodiments, the system 102 may be communicatively coupled to the components shown in FIG. 1 to carry out the desired operations and wherever required modifications may be possible within the scope of the present disclosure.

In some example embodiments, the user equipment may be any user accessible device such as a mobile phone, a smartphone, a portable computer, and the like that are portable in themselves or as a part of another portable/mobile object such as the vehicle. The user equipment may comprise a processor, a memory, and a communication interface. The processor, the memory, and the communication interface may be communicatively coupled to each other. In some example embodiments, the user equipment is associated, coupled, or otherwise integrated with the vehicle, such as an advanced driver assistance system (ADAS), a personal navigation device (PND), a portable navigation device, an infotainment system and/or other device that may be configured to provide route guidance and navigation related functions to the user. In such example embodiments, the user equipment comprises processing means such as a central processing unit (CPU), storage means such as on-board read only memory (ROM) and random access memory (RAM). In various embodiments, the vehicle may be equipped with various sensors for generating or collecting sensor data. For instance, the sensors of the vehicle may include a microphone array; position sensors such as a GPS sensor, gyroscope, a LIDAR sensor; a proximity sensor; motion sensors such as accelerometer; temporal information sensors; orientation sensors augmented with height sensors; tilt sensors; image sensors; and the like. In some example embodiments, the sensor data may be generated and reported to the system 102, at a predefined frequency. For instance, the predefined frequency may be as high as one hertz, based on the capabilities of the sensors. In any which way, the vehicle may be able to gain advantage of the system 102 and method 700, irrespective of the type of the vehicle.

In one embodiment, the user equipment may be directly coupled to the system 102 via the communication network 112. In another embodiment, the user equipment may be coupled to the system 102 via an OEM cloud and the communication network 112. For example, the user equipment may be a consumer vehicle (or a part thereof) and may be a beneficiary of the services provided by the system 102. In some example embodiments, the user equipment may serve the dual purpose of a data gatherer and a beneficiary device. For example, the user equipment may be installed in the vehicle and is configured to detect lane markings on links and/or road segments by using image based sensors installed in the vehicle. The user equipment then sends this detection data to the system 102, which uses optimization techniques to complete any missing parts in the lane markings, improve accuracy of detected lane marking based on real road geometry and generate updated lane marking.

Returning to FIG. 1, the communication network 112 may be wired, wireless, or any combination of wired and wireless communication networks, such as cellular, Wi-Fi, internet, local area networks, or the like. In some embodiments, the communication network 112 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof.

The map database 104a may store node or intersection data, road segment data or link data, point of interest (POI) data, lane marking data or feature data, road obstacles related data, traffic objects related data, posted signs related data (such as road sign data), sensor data related to permissible driving directions, data about valid paths based on legally permissible road geometries or the like, and so forth. The map database 104a may also include cartographic data and/or routing data. The collective data stored in the map database 104a is referred to as map data, hereinafter.

In some embodiments, the map data may be collected by end-user vehicles, such as vehicle 106 which use vehicles' on-board sensors to detect data about various entities such as road objects, lane markings, links, and the like. These vehicles 106 are also referred to as probe vehicles and form an alternate form of data source for map data collection, along with ground truth data. Additionally, data collection mechanisms like remote sensing, such as aerial or satellite photography may be used to collect the data for the map database 104a.

The processing server 105b may comprise one or more processors configured to process requests received from the system 102. The processor may fetch map data from the map database 104a and transmit the same to the system 102 in a format suitable for use by the system 102. In some example embodiments, as disclosed in conjunction with the various embodiments disclosed herein, the system 102 may be used to generate improved lane markings, particularly, improved linear features associated with lane markings of the map data stored in the map database 104a.

Returning to FIG. 3, the processor 302 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 302 may include one or more processing cores configured to perform independently. A multi-core processor may enable multiprocessing within a single physical package. Additionally or alternatively, the processor 302 may include one or more processors configured in tandem via the bus to enable independent execution of instructions, pipelining and/or multithreading. Additionally or alternatively, the processor 302 may include one or more processors capable of processing large volumes of workloads and operations to provide support for big data analysis.

The memory 304 may be non-transitory and may include, for example, one or more volatile and/or non-volatile memories. In other words, for example, the memory 304 may be an electronic storage device (for example, a computer readable storage medium) comprising gates configured to store data (for example, bits) that may be retrievable by a machine (for example, a computing device like the processor 302). The memory 304 may be configured to store information, data, content, applications, instructions, or the like, for enabling the system 102 to carry out various functions in accordance with an example embodiment of the present disclosure. For example, the memory 304 may be configured to buffer input data for processing by the processor 302. The memory 304 may be configured to store instructions for execution by the processor 302.

The memory 304 of the system 102 may be configured to store a dataset (such as, but not limited to, feature data, map data, probe data, sensor data, link data records, lane data records, and navigation or routing instructions) associated with the lane and/or the lane markings. In accordance with an embodiment, the memory 304 may include processing instructions for processing the feature data. The dataset may include real-time data and historical data, from service providers.

In an example, when the processor 302 is embodied as an executor of software instructions, the instructions may specifically configure the processor 302 to perform the algorithms and/or operations described herein when the instructions are executed. However, in some cases, the processor 302 may be a processor specific device (for example, a mobile terminal or a fixed computing device) configured to employ an embodiment of the present disclosure by further configuration of the processor 302 by instructions for performing the algorithms and/or operations described herein. The processor 302 may include, among other things, a clock, an arithmetic logic unit (ALU) and logic gates configured to support operation of the processor 302. The network environment, such as, 100 may be accessed using the communication interface 306 of the system 102. The communication interface 306 may provide an interface for accessing various features and data stored in the system 102.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

I claim:

1. A system comprising:

a memory configured to store computer executable instructions; and one or more processors configured to execute the instructions to:

obtain, in real time, reference feature data for a reference lane marking, the reference lane marking being associated with an intersection location;

generate intersection line feature data for an intersection line lane marking based on the reference feature data up to a first end location, the intersection line lane marking having the intersection location, wherein the reference lane marking is within a predefined proximity from the intersection line lane marking, and wherein the first end location is within a first distance threshold from the intersection location;

determine a first cross-track distance between the first end location and a reference matched location on the reference lane marking, wherein the reference matched location is identified by extending a perpendicular line from the first end location to the reference lane marking;

determine orientation information for the first end location and the reference matched location;

generate intersection feature data for the intersection line lane marking based on the reference feature data, the intersection line feature data, the first cross-track distance, and the orientation information, wherein the intersection feature data is associated with the intersection location, and wherein the intersection feature data is generated from the first end location tile the intersection location; and determine intersection location data for the intersection location based on the reference feature data, the intersection line feature data and the intersection feature data; and provide, in real time, the intersection location data to a vehicle control system to navigate an autonomous vehicle through the intersection location.

2. The system of claim 1, wherein the one or more processors are further configured to:

identify one or more topology segments of the reference lane marking, the one or more topology segments starting after the reference matched location on the reference lane marking;

determine a second cross-track distance between a second end location of a topology segment from the one or more topology segments and an estimate matched point of the intersection line lane marking based on the intersection feature data, wherein the estimate matched point is identified by extending an estimated perpendicular line from the second end location to the intersection line lane marking; and determine the intersection location data for the intersection location based on the second cross-track distance, wherein the second cross-track distance is less than a first predefined threshold, and wherein the intersection location data comprises an intersection location point for the intersection location.

3. The system of claim 1, wherein the one or more processors are further configured to:

obtain sensor data for the intersection line lane marking;

obtain map topology data associated with the intersection line lane marking; and generate the intersection line feature data for the intersection line lane marking based on the sensor data, the map topology data reference feature data and a restriction condition, wherein the restriction condition is associated with the intersection location.

4. The system of claim 3, wherein the restriction condition comprises at least one of:

a first restriction condition comprising a restriction to extend the intersection line feature data up to a first distance threshold from the intersection location, and a second restriction condition comprising a restriction to generate the intersection line feature data up to a second distance threshold from an end sensor data for the intersection line lane marking.

5. The system of claim 1, wherein the one or more processors are further configured to:

determine heading information for a first topological segment of the intersection line lane marking based on sensor data and map topology data;

determine location information for the first topological segment based on the sensor data and the map topology data; and generate the intersection line feature data for the first topological segment based on a comparison between at least one of: the heading information for the first topological segment with heading information for a corresponding topological segment of the reference lane marking, or the location information for the first topological segment with location information for the corresponding topological segment of the reference lane marking.

6. A method comprising:

obtaining, in real time, reference feature data for a reference lane marking, the reference lane marking being associated with an intersection location;

generating intersection line feature data for an intersection line lane marking based on the reference feature data up to a first end location, the intersection line lane marking having the intersection location, wherein the reference lane marking is within a predefined proximity from the intersection line lane marking, and wherein the first end location is within a first distance threshold from the intersection location;

determining a first cross-track distance between the first end location and a reference matched location on the reference lane marking, wherein the reference matched location is identified by extending a perpendicular line from the first end location to the reference lane marking;

determining orientation information for the first end location and the reference matched location;

generating intersection feature data for the intersection line lane marking based on the reference feature data, the intersection line feature data, wherein the intersection feature data is associated with the intersection location, and wherein the intersection feature data is generated from the first end location tile the intersection location; and determining intersection location data for the intersection location based on the reference feature data, the intersection line feature data and the intersection feature data; and providing, in real time, the intersection location data to a vehicle control system to navigate an autonomous vehicle through the intersection location.

7. The method of claim 6, the method further comprising:

identifying one or more topology segments of the reference lane marking, the one or more topology segments starting after the reference matched location on the reference lane marking;

determining a second cross-track distance between a second end location of a topology segment from the one or more topology segments and an estimate matched point of the intersection line lane marking based on the intersection feature data, wherein the estimate matched point is identified by extending an estimated perpendicular line from the second end location to the intersection line lane marking; and determining the intersection location data for the intersection location based on the second cross-track distance, wherein the second cross-track distance is less than a first predefined threshold, and wherein the intersection location data comprises an intersection location point for the intersection location.

8. The method of claim 6, the method further comprising:

obtaining sensor data for the intersection line lane marking;

obtaining map topology data associated with the intersection line lane marking; and generating the intersection line feature data for the intersection line lane marking based on the sensor data, the map topology data and a restriction condition, wherein the restriction condition is associated with the intersection location.

9. The method of claim 8, wherein the restriction condition comprises at least one of:

a first restriction condition comprising a restriction to extend the intersection line feature data up to a first distance threshold from the intersection location, and a second restriction condition comprising a restriction to generate the intersection line feature data up to a second distance threshold from an end second sensor data for the intersection line lane marking.

10. The method of claim 6, the method further comprising:

determining heading information for a first topological segment of the intersection line lane marking based on sensor data and map topology data;

determining location information for the first topological segment based on the sensor data and the map topology data; and generating the intersection line feature data for the first topological segment based on a comparison between at least one of: the heading information for the first topological segment with heading information for a corresponding topological segment of the reference lane marking, or the location information for the first topological segment with location information for the corresponding topological segment of the reference lane marking.

11. A computer programmable product comprising a non-transitory computer readable medium having stored thereon computer executable instructions, which when executed by one or more processors, cause the one or more processors to carry out operations comprising:

obtaining, in real time, reference feature data for a reference lane marking, the reference lane marking being associated with an intersection location;

generating intersection line feature data for an intersection line lane marking based on the reference feature data up to a first end location, the intersection line lane marking having the intersection location, wherein the reference lane marking is within a predefined proximity from the intersection line lane marking, and wherein the first end location is within a first distance threshold from the intersection location;

determining a first cross-track distance between the first end location and a reference matched location on the reference lane marking, wherein the reference matched location is identified by extending a perpendicular line from the first end location to the reference lane marking;

determining orientation information for the first end location and the reference matched location;

generating intersection feature data for the intersection line lane marking based on the reference feature data, the intersection line feature data, the first cross-track distance, and the orientation information, wherein the intersection feature data is associated with the intersection location, and wherein the intersection feature data is generated from the first end location tile the intersection location; and determining intersection location data for the intersection location based on the reference feature data, the intersection line feature data and the intersection feature data; and providing, in real time, the intersection location data to a vehicle control system to navigate an autonomous vehicle through the intersection location.

12. The computer programmable product of claim 11, the operations further comprising:

identifying one or more topology segments of the reference lane marking, the one or more topology segments starting after the reference matched location on the reference lane marking;

determining a second cross-track distance between a second end location of a topology segment from the one or more topology segments and an estimate matched point of the intersection line lane marking based on the intersection feature data, wherein the estimate matched point is identified by extending an estimated perpendicular line from the second end location to the intersection line lane marking; and determining the intersection location data for the intersection location based on the second cross-track distance, wherein the second cross-track distance is less than a first predefined threshold, and wherein the intersection location data comprises an intersection location point for the intersection location.

\* \* \* \* \*